US010412071B2

(12) United States Patent
Maher et al.

(10) Patent No.: US 10,412,071 B2
(45) Date of Patent: *Sep. 10, 2019

(54) SECURE TRANSACTION SYSTEMS AND METHODS

(71) Applicant: Intertrust Technologies Corporation, Sunnyvale, CA (US)

(72) Inventors: David P. Maher, Livermore, CA (US); Pierre Chavanne, Davis, CA (US); Yutaka Nagao, Cupertino, CA (US); Michael Manente, Sudbury, MA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,860

(22) Filed: Sep. 22, 2017

(65) Prior Publication Data

US 2018/0063113 A1 Mar. 1, 2018

Related U.S. Application Data

(63) Continuation of application No. 14/207,500, filed on Mar. 12, 2014, now Pat. No. 9,807,069.

(Continued)

(51) Int. Cl.
*H04L 29/06* (2006.01)
*H04L 9/32* (2006.01)

(52) U.S. Cl.
CPC ............ *H04L 63/08* (2013.01); *H04L 9/3271* (2013.01); *H04L 63/0492* (2013.01); *H04L 2209/466* (2013.01)

(58) Field of Classification Search
CPC ................ H04L 63/08; H04L 63/0492; H04L 2209/466; H04L 9/3271
See application file for complete search history.

(56) References Cited

U.S. PATENT DOCUMENTS 8,234,387 B2   7/2012   Bradley et al.
8,941,469 B1 *  1/2015   Diorio .................. H04L 9/3247
                                                       340/10.1

(Continued)

FOREIGN PATENT DOCUMENTS

CN      101529791 A     9/2009
JP      2009188769 A    8/2009

(Continued)

OTHER PUBLICATIONS

International Search Report and Written Opinion dated Jul. 10, 2014; PCT Application PCT/US2014/025085.

(Continued)

*Primary Examiner* — Ghodrat Jamshidi
(74) *Attorney, Agent, or Firm* — Finnegan Henderson Farabow Garrett & Dunner LLP

(57) ABSTRACT

Systems and methods are described that use tag authentication and presence verification techniques in connection with a variety of transactions. In certain embodiments, an authentication device may verify the authenticity of a secure tag by determining whether the secure tag stores secret information provisioned by a trusted authority. In some embodiments, such an authentication process may be performed without exposing the secret information to the authentication device, thereby maintaining integrity of the secure tag. In other embodiments, insecure tags and/or tags that do not include secret information are used.

18 Claims, 18 Drawing Sheets

Related U.S. Application Data

(60) Provisional application No. 61/778,122, filed on Mar. 12, 2013, provisional application No. 61/835,069, filed on Jun. 14, 2013, provisional application No. 61/878,195, filed on Sep. 16, 2013, provisional application No. 61/914,212, filed on Dec. 10, 2013, provisional application No. 61/918,506, filed on Dec. 19, 2013, provisional application No. 61/932,927, filed on Jan. 29, 2014.

(56) References Cited

U.S. PATENT DOCUMENTS

| | | | |
|---|---|---|---|
| 9,467,280 B2* | 10/2016 | Jordahl | H04L 9/3273 |
| 9,575,724 B1* | 2/2017 | Liberatori, Jr. | G06F 7/02 |
| 10,042,997 B2* | 8/2018 | Rombouts | G06F 21/33 |
| 2002/0120850 A1* | 8/2002 | Walker | G07D 7/00 |
| | | | 713/178 |
| 2003/0065956 A1* | 4/2003 | Belapurkar | G06F 21/41 |
| | | | 726/14 |
| 2004/0066278 A1* | 4/2004 | Hughes | G06F 21/31 |
| | | | 340/10.1 |
| 2006/0143453 A1 | 6/2006 | Imamoto et al. | |
| 2007/0180519 A1 | 8/2007 | Boccon-Gibod et al. | |
| 2008/0109899 A1 | 5/2008 | Rijnswou Van et al. | |
| 2008/0170695 A1* | 7/2008 | Adler | H04L 9/0841 |
| | | | 380/277 |
| 2008/0214312 A1 | 9/2008 | Richard | |
| 2009/0106042 A1 | 4/2009 | Maytal et al. | |
| 2009/0300364 A1* | 12/2009 | Schneider | H04L 9/3271 |
| | | | 713/178 |
| 2010/0001840 A1 | 1/2010 | Kang et al. | |
| 2010/0080391 A1* | 4/2010 | Shah | G06F 21/64 |
| | | | 380/277 |
| 2010/0121767 A1* | 5/2010 | Coulter | G06Q 20/02 |
| | | | 705/67 |
| 2010/0161434 A1* | 6/2010 | Herwig | G06Q 20/201 |
| | | | 705/20 |
| 2010/0161994 A1 | 6/2010 | Serret Avila et al. | |
| 2010/0277287 A1* | 11/2010 | Choi | H04L 9/3273 |
| | | | 340/10.42 |
| 2010/0293049 A1 | 11/2010 | Maher et al. | |
| 2010/0308978 A1* | 12/2010 | Brown | H04L 9/3252 |
| | | | 340/10.42 |
| 2011/0050756 A1* | 3/2011 | Cassidy | G09G 3/20 |
| | | | 345/690 |
| 2011/0248852 A1 | 10/2011 | Falk et al. | |
| 2013/0046976 A1* | 2/2013 | Rosati | H04L 63/0853 |
| | | | 713/168 |
| 2013/0124855 A1* | 5/2013 | Varadarajan | G06Q 20/3276 |
| | | | 713/155 |
| 2013/0151419 A1* | 6/2013 | Hitchcock | G06Q 30/06 |
| | | | 705/75 |
| 2013/0219180 A1* | 8/2013 | Saino | G06F 21/42 |
| | | | 713/171 |
| 2013/0272520 A1 | 10/2013 | Noda et al. | |
| 2013/0332987 A1 | 12/2013 | Tenneti et al. | |
| 2014/0025542 A1* | 1/2014 | Sharma | G06Q 10/08 |
| | | | 705/28 |
| 2014/0025660 A1 | 1/2014 | Mohammed et al. | |
| 2014/0357187 A1 | 12/2014 | Ehrensvärd | |
| 2015/0302409 A1* | 10/2015 | Malek | G06Q 20/3224 |
| | | | 705/44 |

FOREIGN PATENT DOCUMENTS

| | | |
|---|---|---|
| JP | 2010191557 A | 9/2010 |
| JP | 2011507060 A | 3/2011 |
| WO | WO 2007/128966 A1 | 11/2007 |
| WO | WO 2008/033590 A2 | 3/2008 |

OTHER PUBLICATIONS

Extended European Search Report dated Feb. 26, 2016; EPO Application 14779911.8.

Morshed, M, et al.; "Privacy and Security Protection of RFID Data in E-passport"; IEEE 5th International Conference on Software, Knowledge Information, Industrial Management and Applications; Sep. 8, 2011; pp. 1-7.

Saeed, M. et al.; "Off-line NFC Tag Authentication"; IEEE 7th International Conference for Internet Technology and Secured Transactions; Dec. 10, 2012; pp. 730-735.

Office Action dated May 1, 2015, issued in related U.S. Appl. No. 14/207,500, filed Mar. 12, 2014.

Final Office Action dated Dec. 30, 2015, issued in related U.S. Appl. No. 14/207,500, filed Mar. 12, 2014.

Office Action dated Jul. 8, 2016, issued in related U.S. Appl. No. 14/207,500, filed Mar. 12, 2014.

Final Office Action dated Feb. 9, 2017, issued in related U.S. Appl. No. 14/207,500, filed Mar. 12, 2014.

Notice of Allowance dated Jun. 23, 2017, issued in related U.S. Appl. No. 14/207,500, filed Mar. 12, 2014.

Japanese Office Action (Notification of Reasons for Refusal) dated Feb. 13, 2018, issued in related Japanese Application No. 2016-501739.

Japanese Office Action (Decision of Refusal) dated Nov. 20, 2018, issued in related Japanese Application No. 2016-501739.

Indian Office Action dated May 27, 2019, issued in Application No. 2862/KOLNP/2015.

European Office Action dated Mar. 14, 2019 issued in related European Office Action No. 14779911.8—1218.

Chinese Office Action dated Apr. 2, 2019.

* cited by examiner

SECURE TRANSACTION SYSTEMS AND METHODS

RELATED APPLICATIONS

This application claims the benefit of priority under 35 U.S.C. § 119(e) to U.S. Provisional Patent Application No. 61/778,122, filed Mar. 12, 2013, and entitled "OBJECT IDENTIFICATION SYSTEMS AND METHODS", to U.S. Provisional Patent Application No. 61/835,069, filed Jun. 14, 2013, and entitled "SECURE TRANSACTION SYSTEMS AND METHODS", to U.S. Provisional Patent Application No. 61/878,195, filed Sep. 16, 2013, and entitled "SECURE TRANSACTION SYSTEMS AND METHODS", to U.S. Provisional Patent Application No. 61/914,212, filed Dec. 10, 2013, and entitled "SECURE TRANSACTION SYSTEMS AND METHODS", to U.S. Provisional Patent Application No. 61/918,506, filed Dec. 19, 2013, and entitled "SECURE TRANSACTION SYSTEMS AND METHODS," and to U.S. Provisional Patent Application No. 61/932,927, filed Jan. 29, 2014, and entitled "DOCUMENT EXECUTION SYSTEMS AND METHODS," all of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

The present disclosure relates generally to systems and methods for conducting a variety of secure transactions. More specifically, but not exclusively, the present disclosure relates to systems and methods that use electronic tags and/or presence verification in connection with a variety of transactions.

Electronic tags may be used in a variety of beneficial applications, including product inventory control, value and/or reward card systems, personal identification systems, and/or the like. Systems using conventional electronic tags, however, may not be particularly robust. For example, in value and/or reward card systems utilizing conventional electronic tags, card balances may be stored in the tag. If such a card is stolen, a user is likely to be at least temporarily inconvenienced and may have little if any recourse to recover the value associated with the card. Conventional systems utilizing electronic tags may also require significant security hardening of electronic tag readers and/or associated communication channels. Costs associated with secure hardware included in conventional tag readers may discourage the widespread adoption of such systems. Moreover, existing systems utilizing electronic tags may be limited in their ability to securely prove the authenticity and/or validity of a tag and/or determine that a tag is located at a particular place at a particular time. Systems and methods are described herein that ameliorate some or all of these problems. For example, without limitation, in some existing electronic tag-based systems, electronic tags are relatively easy to copy unless relatively sophisticated and/or expensive techniques are used. In some embodiments of the systems and methods disclosed herein, server-side methods are used in an end-to-end system that obviate or reduce the need for security in the tag and/or in the tag reader.

Systems and methods disclosed herein facilitate electronic tag and/or presence verification. In some embodiments, use is made of virtual tags that may be resident in consumer devices such as mobile phones and tablets, rather than a physical tag. Unless otherwise clear from the context, references made herein to secure electronic tags, electronic tags, tags, and/or the like are meant to encompass any suitable implementation (e.g., a secure chip, a virtual tag or value stored in a user's device, etc.). In certain embodiments, the disclosed systems and methods may use a secure electronic tag configured to store secret information provisioned by a trusted authority. Knowledge of this secret information by the tag may be verified by the trusted authority to authenticate the presence of the tag in proximity to a tag authentication device. Embodiments of the disclosed systems and methods may be used in connection with a variety of secure transactions requiring a trusted verification that an electronic tag is physically present proximate to a tag authentication device at a particular time.

To authenticate a secure electronic tag, a tag authentication device may detect the presence of the tag proximate to the authentication device via any suitable communication method. Upon detecting the presence of a tag, the authentication device may communicate with a trusted authority associated with the tag and request authentication of the tag by the trusted authority. In response, the trusted authority may generate challenge information and communicate the challenge information to the authentication device. In certain embodiments, the challenge information may comprise a randomly-generated value, although other types of challenge information may also be used in connection with the disclosed systems and methods. The authentication device may communicate the challenge information to the electronic tag and request that a response be generated by the tag based on the challenge information. In certain embodiments, the requested response may comprise a result of a computation performed by the electronic tag using the challenge information and the secret information (e.g., a digital signature, hash, and/or encrypted version of the challenge information using the secret information, and/or the like).

The tag may communicate the response to the authentication device that in turn may forward it to the trusted authority. Upon receipt of the response, the trusted authority may generate its own response based on the challenge information and secret information that the trusted authority stores and/or otherwise possesses associated with the tag. If the response generated by the tag and the response generated by the trusted authority match, knowledge of the secret information stored by the tag may be verified by the trusted authority and the tag may be authenticated. If the responses do not match, the tag may not be verified by the trusted authority. An indication of whether the tag has been authenticated by the trusted authority may be communicated to the authentication device and/or one or more other service providers for use in connection with providing services associated with the tag.

Certain embodiments of the authentication systems and methods disclosed herein may provide for authentication of both a tag as well as a contextual interaction between a tag, a reader, and/or a trusted authority or other trusted service. As an example, in some embodiments, challenge information used in generating a challenge response may be communicated by the tag to an authentication device and/or a trusted authority in addition to the challenge response. While the challenge response may indicate possession of certain secret information by the tag, if the tag fails to also communicate the associated challenge information to the authentication device and/or trusted authority, however, proper interaction between the tag, authentication device, and/or trusted authority consistent with embodiments disclosed herein may not be authenticated. For example, in such a circumstance, it may be suspected that the tag response was fabricated and/or otherwise generated in some other context than a prescribed tag, authentication device, and/or trusted authority interaction consistent with embodiments disclosed herein.

Embodiments of the systems and methods disclosed herein may allow for secret information stored by the tag and/or the trusted authority to not be exposed to the authentication device and/or related service provider systems and/or directly communicated from the tag or the trusted authority. In certain embodiments, this may reduce the security complexity of the authentication device and/or associated hardware, software, and/or communication channels. The systems and methods disclosed herein may be used in connection with a variety of secure transactions utilizing secure electronic tags including, without limitation, product authentication, inventory, and/or ownership services, product information distribution services, value and/or loyalty card systems (e.g., private currency systems), ticketing systems, electronic payment systems, user authentication services, document signing services, electronic commerce services (e.g., auction services), and/or the like. In some embodiments, systems and methods are disclosed that can be used to construct services that securely maintain a one-to-one correspondence between tags and physical items, enabling secure item tracking and tracing through a distribution chain to an end consumer, thereby helping to prevent theft and fraud.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
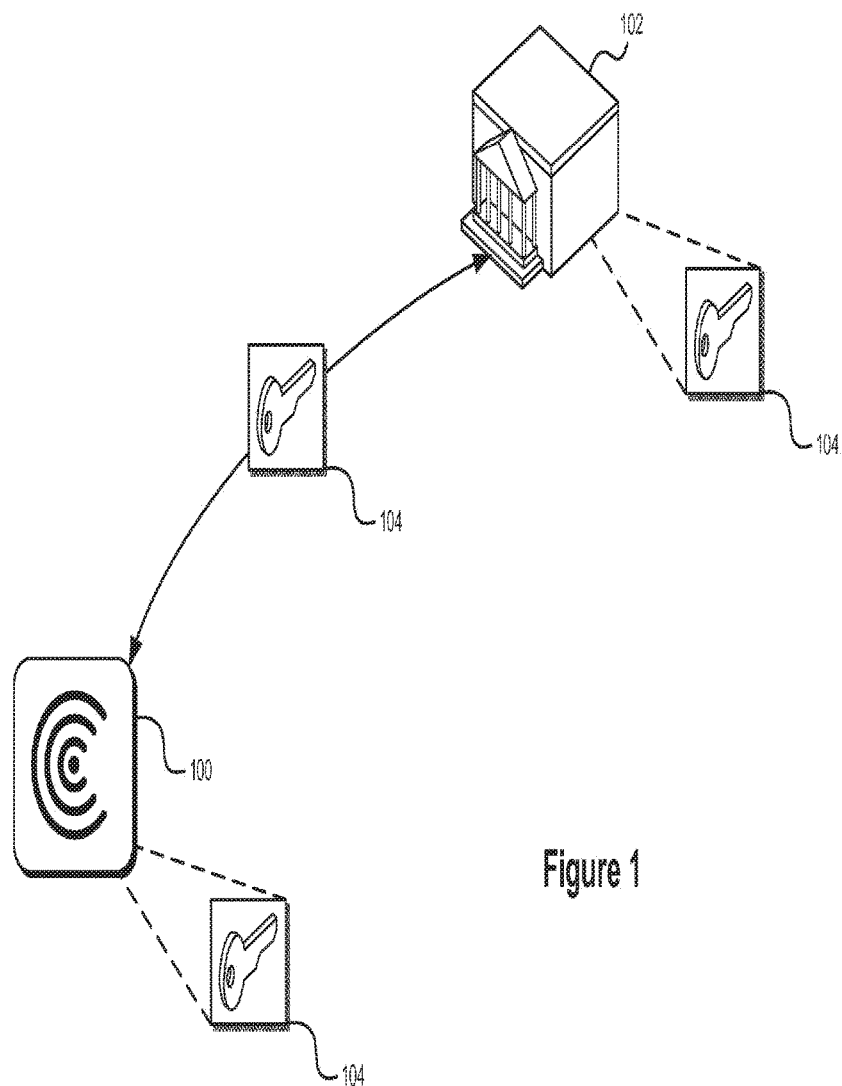
FIG. 1 illustrates provisioning of an electronic tag consistent with embodiments of the present disclosure.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Some embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of certain illustrative embodiments is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments disclosed herein allow for secure verification of the presence of an electronic tag. Such verification may be used in connection with a variety of secure transactions. For example, a serialized product may be associated with a tag implementing embodiments disclosed herein. A trusted authority in communication with a tag authentication device may verify the authenticity of the tag, thereby verifying the authenticity of the associated serialized product. Similarly, embodiments disclosed herein may be used to verify the authenticity and/or status of a value card (e.g., a private currency card such as an access pass, a transit pass, and/or the like) or other similar device that includes a tag in connection with card transactions. Such implementations of the disclosed embodiments may, among other things, reduce the production and/or distribution of counterfeit products and/or value cards by unauthorized persons.

The disclosed embodiments may allow for use of a relatively low-cost tag authentication device in connection with secure tag authentication such as, for example, a mobile smartphone and/or tablet computing device. As some embodiments allow for secret information used in connection with tag authentication to not be exposed to the authentication device, hardware and/or software security requirements of the authentication device may be reduced. By reducing the cost and/or complexity of tag authentication devices, the disclosed systems and methods may increase the adoption of secure tag and/or presence authentication in connection with a variety of services. Moreover, the disclosed embodiments may allow use of a common trusted authority for secure tag authentication by a variety of service providers, thereby facilitating easier integration of tag authorization and/or presence verification in connection with a variety of services.

In certain embodiments, the systems and methods described herein can, for example, be used in connection with digital rights management ("DRM") technologies such as that described in commonly assigned, co-pending U.S. patent application Ser. No. 11/583,693, "Digital Rights Management Engine Systems and Methods," filed Oct. 18, 2006 and published as U.S. Pub. No. 2007/0180519 A1 ("the '693 application"), service orchestration and DRM technologies such as those described in commonly assigned U.S. Pat. No. 8,234,387, "Interoperable Systems and Methods for Peer-to-Peer Service Orchestration" ("the '387 patent"), data collection and analysis technologies such as those described in commonly assigned co-pending U.S. patent application Ser. No. 13/914,538 ("the '538 application"), information targeting technologies such as those described in commonly assigned co-pending U.S. patent application Ser. No. 13/946,750 ("the '750 application"), and/or content delivery technologies such as those described in commonly assigned co-pending U.S. patent application Ser. No. 12/785,406 ("the '406 application") (the contents of '693 application, the '387 patent, the '538 application, the '750 application, and the '406 application hereby being incorporated by reference in their entireties), as well as in other contexts.

Secure Tag Provisioning

FIG. 1 illustrates provisioning of a secure electronic tag 100 consistent with embodiments of the present disclosure. The secure electronic tag 100 may comprise any suitable electronic hardware and/or software configured to securely store provisioned information 104 (e.g., secret information) and to generate one or more responses based on the information in response to a query (e.g., signed values, hash values, encrypted values, and/or other computations, derivations, or transformations, etc.) from a tag authentication device. In addition to storing information 104, the secure tag 100 may be configured to store a variety of other information used in connection with embodiments disclosed herein. The secure electronic tag 100 may be configured to communicate with a tag authentication device and/or other associated systems (e.g., a trusted authority 102 during a tag provisioning process) using any suitable wired and/or wireless communication protocol(s). Although, for ease of explanation, reference will often be made herein to a secure tag, it will be appreciated that in some embodiments tag security may be derived from the security capabilities of a server, as opposed to the security capabilities intrinsic to a tag. Thus a tag may be called secure by virtue of the fact that it is an identifiable part of a service that provides for security of an end-to-end system. Unless otherwise clear from the context, references made herein to secure tags are meant to encompass at least both of these scenarios (e.g., systems that make use of hardened/secure tags, and/or systems that make use of tags that derive, their security from their interaction with a remote server in the context of a service in which they participate).

In certain embodiments, the secure tag 100 may comprise a Near Field Communication ("NFC") tag, a radio-frequency identification ("RFID") tag, a universal serial bus ("USB") token, a Bluetooth®-enabled ("BLE") device storing secure information, and/or the like. In further embodiments, the secure tag 100 may be implemented via hardware and/or software included in an associated device. For example, the secure tag 100 may be implemented using a secure software application (or "app") executing on a device (e.g., a smartphone) and/or may be included in secure hardware of the device (e.g., secure hardware included in a smartphone). It will be appreciated that a variety of other types of tags may be used in connection with the tag authentication and/or presence verification processes disclosed herein, and that any type of electronic tag may be used in connection with the disclosed embodiments.

In certain embodiments, the tag 100 may be provisioned with secret information 104 by a trusted authority 102. The secret information 104 may comprise any suitable information and/or value that may be used in connection with the embodiments disclosed herein. In certain embodiments, the secret information 104 may comprise an electronic key, a digital signature, information used to compute a hash value, a trusted credential, and/or the like. In some embodiments, the secret information 104 provisioned by the trusted authority 102 may be unique to a particular tag 100. In other embodiments, the tag need not be provisioned with secret information 104, but may, for example, store authenticated information, and the secrets used for authentication can, for example, be stored on a server (e.g., a server associated with the trusted authority 102).

When provisioned with secret information 104 by the trusted authority 102, the tag 100 may persistently store the secret information 104 for use in connection with the disclosed tag authentication and/or presence verification processes. In further embodiments, the trusted authority 102 and/or one or more third parties (e.g., third-party service providers) may provision other information for storage by the tag 100. For example, a variety of metadata and/or transaction information associated with the tag 100 (e.g., tag identification information, associated product and/or device metadata information, service provider information, and/or the like) may be provisioned to and stored by the secure tag 100 for use in connection with the disclosed embodiments. Such metadata and/or transaction information may be either stored securely and/or insecurely by the tag 100 depending on security requirements and/or preferences associated with the information and/or the tag 100. In other embodiments, the tag 100 may be provisioned with a serialized identifier that is in one-to-one correspondence with a set of items that are to be tracked and/or otherwise traced. The identifier itself can be a randomly selected value in one-to-one association with individual serialized items, thereby making it difficult for fraudsters to predict these values.

Secure Tag Authentication

Figure 2:
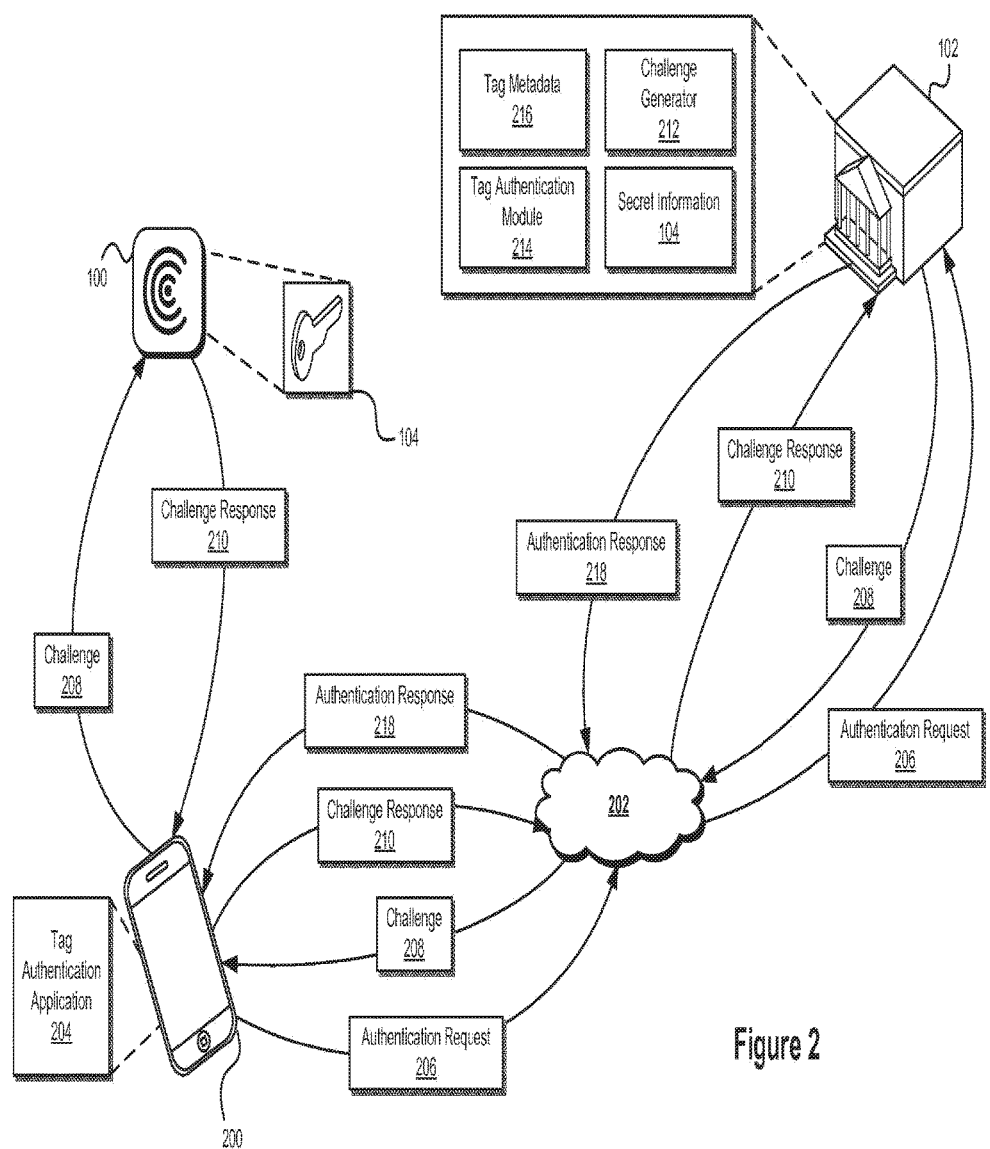
FIG. 2 illustrates authentication of an electronic tag consistent with embodiments of the present disclosure.

FIG. 2 illustrates authentication of an electronic tag 100 consistent with embodiments of the present disclosure. After a tag 100 is provisioned with secret and/or authenticated information 104 by a trusted authority 102, a tag authentication device 200 may be used to verify the authenticity of the tag 100. That is, the tag authentication device 200 may be used to determine that the tag 100 is an authentic tag provisioned by the trusted authority 102 and/or that the tag 100 is physically located proximate to the authentication device 200 and/or at a particular time. As discussed in more detail below, such information may be used as a proof-of-presence or proximity of the tag 100, tag authentication device 200, and/or an associated item (e.g., a product, a value and/or loyalty card, an identification card or item, and/or the like) with respect to each other in connection with any of a variety of secure transactions.

The tag authentication device 200, the trusted authority 102, and/or one or more other service providers (not shown) may comprise any suitable computing system or combination of systems configured to implement embodiments of the systems and methods disclosed herein. In certain embodiments, the tag authentication device 200, trusted authority 102, and/or other service providers may comprise at least one processor system configured to execute instructions stored on an associated non-transitory computer-readable storage medium. As discussed in more detail below, the tag authentication device 200, trusted authority 102, and/or other service providers may further comprise a secure processing unit ("SPU") configured to perform sensitive operations such as trusted credential and/or key management, secure policy management, and/or other aspects of the systems and methods disclosed herein. The tag authentication device 200, trusted authority 102, and/or other service providers may further comprise software and/or hardware configured to enable electronic communication of information between the devices and/or systems 102, 200 via one or more associated network connections (e.g., network 202).

The tag authentication device 200 may comprise a computing device executing one or more applications configured to implement embodiments of the systems and methods disclosed herein. In certain embodiments, the tag authentication device 200 may comprise a laptop computer system, a desktop computer system, a smartphone, a tablet computer, a tag authentication terminal system, and/or any other computing system and/or device that may be used in connection with the disclosed systems and methods. In certain embodiments, the tag authentication device 200 may comprise software and/or hardware configured to, among other things, determine that the secure tag 100 is an authentic tag provisioned by the trusted authority 102 and that secure tag 100 is physically located proximate to the authentication device 200 and/or is present at a particular time. In some embodiments, such functionality may be implemented using one or more applications (e.g., a tag authentication application 204) executing on the tag authentication device 200 associated with the trusted authority 102 and/or one or more service providers.

Certain of the disclosed embodiments may allow for a relatively low-cost general purpose tag authentication device 200 to be used in connection with secure tag authentication and/or presence verification. As the tag authentication device 200 may not be exposed to information 104 used in connection with the disclosed systems and methods, in certain embodiments the authentication device 200 may not need to include certain secure software and/or hardware required to maintain any security associated with this information 104. For example, in certain embodiments, a general-purpose smartphone and/or tablet computing device executing a tag authentication application (or "app") 204 (e.g., an authentication application provided by the trusted authority 102 and/or another service provider) may be used to implement certain aspects of the disclosed embodiments. In further embodiments, the tag authentication device 200 may include secure software and/or hardware used in connection with the disclosed systems and methods.

The tag authentication device 200 may communicate with the trusted authority 102 and/or other service providers via a network 202 comprising any suitable number of networks and/or network connections. The network connections may comprise a variety of network communication devices and/or channels and may use any suitable communication protocols and/or standards facilitating communication between the connected devices and systems. For example, in some embodiments the network may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee®, and or any other suitable communication protocol(s).

The tag authentication device 200 may be configured to communicate with the secure tag 100 via any suitable type of wired and/or wireless communication protocol(s). In some embodiments, the tag authentication device 200 may communicate with the secure tag 100 using NFC, RFID, TransferJet, Zigbee®, Bluetooth®, IEEE's 802.11 standards, and/or other suitable wireless communication protocols including any of the communication protocols disclosed herein. In certain embodiments, the tag authentication device 200 may communicate one or more queries including challenge information 208 to the secure tag 100 and/or receive one or more responses 210 and/or other information from the secure tag 100.

The tag authentication device 200 may execute a tag authentication application 204 used in connection with tag authentication and/or presence verification processes consistent with embodiments disclosed herein. In certain embodiments, the tag authentication application 204 may be provided to the tag authentication device 200 by the trusted authority 102 for performing tag authentication and/or presence verification processes. In further embodiments, the tag authentication application 204 may be provided to the tag authentication device 200 by one or more third parties including, for example, service providers offering services utilizing tag authentication and/or presence verification processes disclosed herein.

In certain embodiments, the tag authentication application 204 may perform a polling process with the tag authentication device 200 to detect proximately-located secure tags 100 via any suitable communication method (e.g., NFC, RFID communication, etc.). It will be appreciated, however, that any suitable tag detection process could be used in connection with the disclosed embodiments (e.g., the tag could send an alert to the tag authentication device, etc.). When the tag authentication application 204 detects a proximately-located tag 100, the tag authentication application 204 may generate and communicate a tag authentication request 206 to the trusted authority 102 requesting authentication of the tag 100.

In some embodiments, a secure tag 100 may be detected by the tag authentication device 200 in a variety of other ways, including using methods that do not involve a polling process performed by a tag authentication application 204 and/or an authentication device 200. In some embodiments, the tag authentication device 200 may transmit (e.g., periodically transmit) an energy burst and/or other electromagnetic signal (e.g., radio signal or the like) that, when received by a proximately-located tag 100, may cause the tag 100 to generate a response. Alternatively, the tag authentication device 200 may emit a low-energy electromagnetic field. When a tag 100 comes within the range of the field emitted by the tag authentication device 200, the field may change in some manner detectable by the authentication device 200, thereby allowing the authentication device 200 to identify the proximately-located tag 100, In further embodiments, a tag 100 may actively transmit a signal to a proximately-located tag authentication device 200 indicating its presence. For example, an NFC-based tag and/or a tag implemented electronically using a smartphone application may transmit a signal and/or beacon indicating its presence proximate to a tag authentication device 200. It will be appreciated that a variety of other suitable tag detection processes may be use, and that any suitable type of tag detection process may be implemented by the tag 100 and/or the authentication device 200 in connection with the embodiments disclosed herein. For example, although certain embodiments and/or examples are described herein as using polling process for tag detection, it will be appreciated that any suitable tag detection process, including without limitation any tag detection process disclosed herein, may be used in connection with the disclosed embodiments and/or examples.

Upon receipt of the tag authentication request 206, the trusted authority 102 may generate challenge information 208 using a challenge generator 212 executing thereon. In certain embodiments, the challenge information 208 may comprise a randomly and/or pseudo-randomly-generated value such as a cryptographic nonce, although other types of challenge information may also be used in connection with the disclosed systems and methods. The trusted authority 102 may communicate the generated challenge information 208 to tag authentication device 200, which, in turn, may communicate the challenge information 208 to the tag 100 as part of a challenge query.

The challenge query may request that the tag 100 return a response based, at least in part, on the challenge information 208. In certain embodiments, the requested response may comprise a result of a computation performed by the tag 100 based on the challenge information 208 and the secret information 104 stored by the tag 100. For example, the computation may comprise calculating a digitally-signed value, encrypted value, MAC value, and/or a hash value of a cryptographic nonce included in the challenge information 208 using, at least in part, the secret information 104. In certain embodiments, the computation may return a result that, based on the challenge information 208 alone, may not be used to identify the secret information 104 and/or may otherwise obfuscate the secret information 104 used in connection with the computation.

The tag 100 may communicate a challenge response 210, generated in response to the challenge query, to the authentication device 200. In certain embodiments, the challenge response 210 may comprise the result of the computation performed by the tag 100 based on the challenge information 208 and the secret information 104. The authentication device 200 may then forward the challenge response 210 to the trusted authority 102. Upon receipt of the challenge response 210, the trusted authority 102 may perform a tag authentication process using a tag authentication module 214 executing thereon. As part of the tag authentication process, the tag authentication module 214 may generate a response based, at least in part, on the challenge information 208 and secret information stored by the trusted authority 102. For example, the tag authentication module 214 may compute a digitally-signed value, encrypted value, MAC value, hash value, and/or other derivation or transformation of the cryptographic nonce included in the challenge information 208. In certain embodiments, the computation performed by the tag authentication module 214 may be the same as or similar to the computation performed by the tag 100 in response to a challenge query.

After generating the response, the tag authentication module 214 may compare the generated response with the challenge response 210 generated by the secure tag 100. If the response generated by the tag authentication module 214 and the challenge response 210 generated by the secure tag 100 match, the tag authentication module 214 may verify that both the secure tag 100 and the trusted authority 102 possess the same secret information 104 and, therefore, that the secure tag 100 is an authentic secure tag 100. If the responses do not match, however, the tag authentication module 214 may not verify the authenticity and/or propriety of the secret information 104 possessed by the secure tag 100. Therefore, in such an instance, the tag authentication module 214 may determine that the secure tag 100 is not authentic. In this manner, a determination may be made whether the secure tag 100 has been provisioned with secret information 104 by the trusted authority 102 and is therefore authentic or has not been provisioned with such information and therefore is not authentic. In other embodiments, asymmetric cryptographic techniques can be used to verify the response 210, whereby the tag authentication module 214 need not have knowledge of the information maintained by the tag 100, but could instead possess the corresponding asymmetric cryptographic value (e.g., a public key corresponding to the tag's private key or vice-versa).

An authentication response 218 may be returned to the authentication device 200 and/or one or more other third-party services (not shown) based on the determination performed by the tag authentication module 214. For example, if the tag authentication module 214 determines that the secure tag 100 is authentic, the authentication response 218 may include an indication that the secure tag 100 is authentic. Similarly, if the tag authentication module 214 determines that the secure tag 100 is not authentic, the authentication response 218 may include an indication that the secure tag 100 is not authentic. In certain embodiments, information included in the authentication response 218 may be displayed on the authentication device 200 (e.g., via the tag authentication application 204), allowing a user of the authentication device 200 to receive an indication of whether the secure tag 100 has been authenticated by the trusted authority 102 in connection with a variety of secure transactions. In some embodiments, the authentication device 200 and/or trusted authority 102 may forward an authentication response 218 to a service provider so that the service provider can confirm the proof of presence.

In some embodiments, if the tag authentication module 214 determines that a secure tag 100 is authentic, the authentication response 218 may further comprise certain tag metadata 216 and/or transaction information associated with the secure tag 100. For example, in certain embodiments, the tag metadata 216 may comprise tag identification information, information relating to a product and/or device associated with secure tag 100, and/or any other information that may be associated with the secure tag 100 and/or a transaction utilizing the same as a means for authentication. Metadata and/or other information included in the authentication response 218 may further be displayed to a user of the tag authentication device 200. For example, a photo of a user associated with an authenticated secure tag 100 may be included in the authentication response 218 and displayed on the authentication device 200, thereby allowing a user of the authentication device 200 to verify that a person presenting the secure tag 100 to the authentication device 200 is associated with the secure tag 100 as indicated by the trusted authority 102.

Embodiments of the systems and methods disclosed herein may allow for secret information 104 stored by the secure tag 100 and/or the trusted authority 102 to not be exposed to the authentication device 200 and/or related service provider systems and/or directly communicated from the secure tag 100 or the trusted authority 102. As secret information 104 is not exposed to the authentication device 200, the authentication device 200 may not need to include security-hardened software and/or hardware components designed to protect the propriety of such secret information 104, thereby lessening the cost and complexity required to implement such authentication devices. Moreover, after the initial provisioning of secret information 104 to the tag 100, the secret information 104 need not be communicated between the tag 100 and various other systems and/or devices (e.g., authentication device 200 and/or trusted authority 102). Accordingly, such communication channels may be relatively insecure communication channels. In some embodiments, this may allow existing data networks including, for example, open mobile device data networks, the Internet, and/or the like to be used in connection with various disclosed embodiments.

In some embodiments, the tag 100 and/or the trusted authority 102 may be security-hardened (e.g., using secure software and/or hardware-based security techniques), whereas the authentication device 200 may not be security-hardened and/or be security-hardened to a lesser degree. In some embodiments, trustedness of the authentication device 200 may be contextually established based on its issuance by a trusted entity and/or provenance control mechanisms associated with the device 200. For example, an owner of an authentication device 200 may prescribe a certain degree of trust to the device 200 based on the issuance and/or possession of the device 200 to a user being tightly controlled by established provenance control mechanisms.

In further embodiments, systems and methods disclosed herein may be implemented using relatively insecure tags 100 and/or authentication devices 200 (e.g., tags 100 and/or devices 200 implementing less security-hardening than the trusted authority 102). The trusted authority 102 may implement more robust security measures (e.g., using secure software and/or hardware-based security techniques, taking advantage of its remote location to restrict access to the data and/or processes thereon, and/or the like). In certain embodiments, such a configuration may allow for utilization of centralized security, use of a relatively low-cost existing tag authentication devices 200 (e.g., a mobile smartphone and/or tablet computing device executing a tag authentication application 204), and/or relatively insecure tags 100. For example, in some embodiments, a tag 100 may not store secret information 104 and/or otherwise secure information but store a provisioned identifier unique to the tag 100. The trusted authority 102 may, in connection with the authentication device 200, authenticate the tag 100 based on a determination that the tag 100 stores the unique identifier. As discussed in more detail below, in connection with product validation, a one-to-one correspondence between a tag and an associated item may be maintained by the trusted authority 102. Based on this correspondence, the trusted authority 102 may be able to detect counterfeit tags 100 and/or items (e.g., by identifying tags having duplicate identifiers or the like) and/or take appropriate actions in response to the same (e.g., notifying an authority or the like).

It will be appreciated that a number of variations can be made to the architecture and relationships presented in connection with FIG. 2 within the scope of the inventive body of work. For example, without limitation, in some embodiments, some or all of the functions performed by the authentication device 200 may be performed by the trusted authority 102. Similarly, some or all of the functions performed by the trusted authority 102 may be performed by the authentication device 200. As discussed in more detail below, certain aspects of secure tag authentication and/or presence verification processes illustrated in FIG. 2 may be used in connection with a variety of secure transactions utilizing secure electronic tags including, without limitation, product authentication, inventory management, and/or ownership services, product information distribution services, value and/or loyalty card systems (e.g., private currency systems), user authentication services, document signing services, electronic commerce services (e.g., auction services), identification services, electronic currency systems, and/or the like. Thus it will be appreciated that FIG. 2 is provided for purposes of illustration and explanation, and not limitation.

Figure 3:
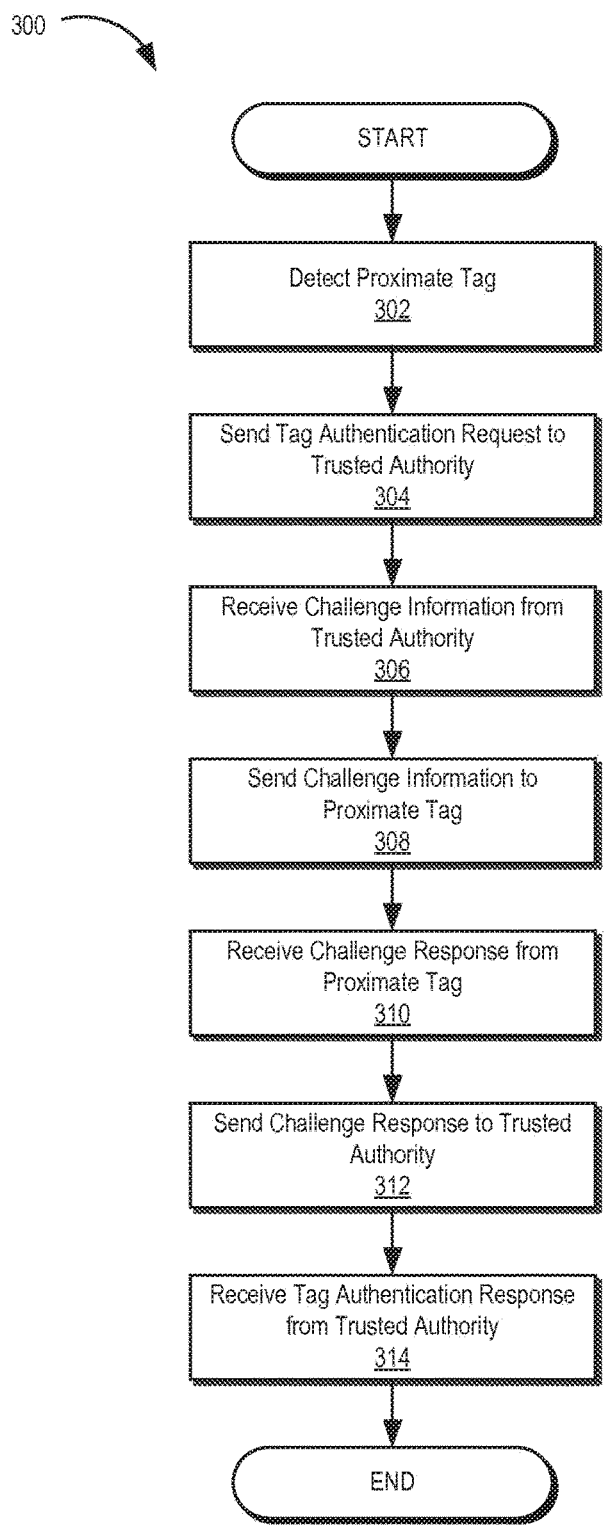
FIG. 3 illustrates a flow chart of an exemplary method for authenticating an electronic tag by an authentication device consistent with embodiments of the present disclosure.

FIG. 3 illustrates a flow chart of an exemplary method 300 for authenticating a secure electronic tag by an authentication device consistent with embodiments of the present disclosure. The illustrated method 300 may be implemented in a variety of ways, including using software, firmware, hardware, and/or any combination thereof. In certain embodiments, the method 300 may be implemented, at least in part, by a tag authentication application executing on an authentication device as described above.

At 302, a secure tag located near the tag authentication device may be detected by the device. In certain embodiments, the secure tag may be detected in response to a polling process performed by the authentication device. For example, the authentication device may perform a polling process with an associated wireless communication system (e.g., NFC, RFID communication, etc.). In certain embodiments, the wireless communication system may have a particular range extending from the authentication device. Accordingly, when a secure tag is detected within range of the wireless communication system, it may be determined that the secure tag is located proximate to the tag authentication device. In this manner, embodiments disclosed herein may be used to determine both that a secure tag is an authentic tag provisioned by a trusted authority and that the authentic tag is located proximate to the authentication device (e.g., presence verification).

Upon detecting a secure tag, at 304, a tag authentication request requesting authentication of the secure tag may be communicated from the tag authentication device to a trusted authority. In certain embodiments, the tag authentication request may include information received by the authentication device from the proximate secure tag including, for example, tag identification information, transaction information, and/or the like. In certain embodiments, such information may be used by the trusted authority in generating challenge information later communicated to the secure tag as part of a tag authentication process.

The tag authentication device may receive challenge information from the trusted authority at 306 in response to the tag authentication request. In certain embodiments, the challenge information may comprise a randomly and/or pseudo-randomly-generated value such as a cryptographic nonce, although other types of challenge information may also be used in connection with the disclosed systems and methods. In other embodiments, the tag authentication device and/or another third-party service may generate challenge information and communicate it to the tag and/or the trusted authority.

At 308, the tag authentication device may communicate the challenge information to the proximately-located tag as part of a challenge query requesting that the secure tag return a response based, at least in part, on the challenge information. In certain embodiments, the requested response may comprise a result of a computation (e.g., a digital signing operation, a hash calculation, etc.) performed by the secure tag based on the challenge information and the secret information stored by the secure tag.

A response to the challenge query may be received by the tag authentication device from the proximately-located secure tag at 310 that in turn may be forwarded to the trusted authority at 312 for authentication by the trusted authority. At 314, a tag authentication response may be received from the trusted authority indicating whether the tag is an authentic secure tag provisioned by the trusted authority. Based on information included in this response, an indication as to whether the tag is authentic may be provided to a user of the tag authentication device.

In further embodiments, the tag authentication response may include additional metadata (e.g., user information associated with a registered user of the secure tag) and/or other transaction information (e.g., an indication of an account balance associated with a secure tag). It will be appreciated that a variety of metadata and/or transaction information associated with the secure tag may be included in the tag authentication response, and that any suitable type of information that may be used in secure tag authentication processes and/or transactions involving presence verification may be used in connection with the embodiments disclosed herein.

Figure 4:
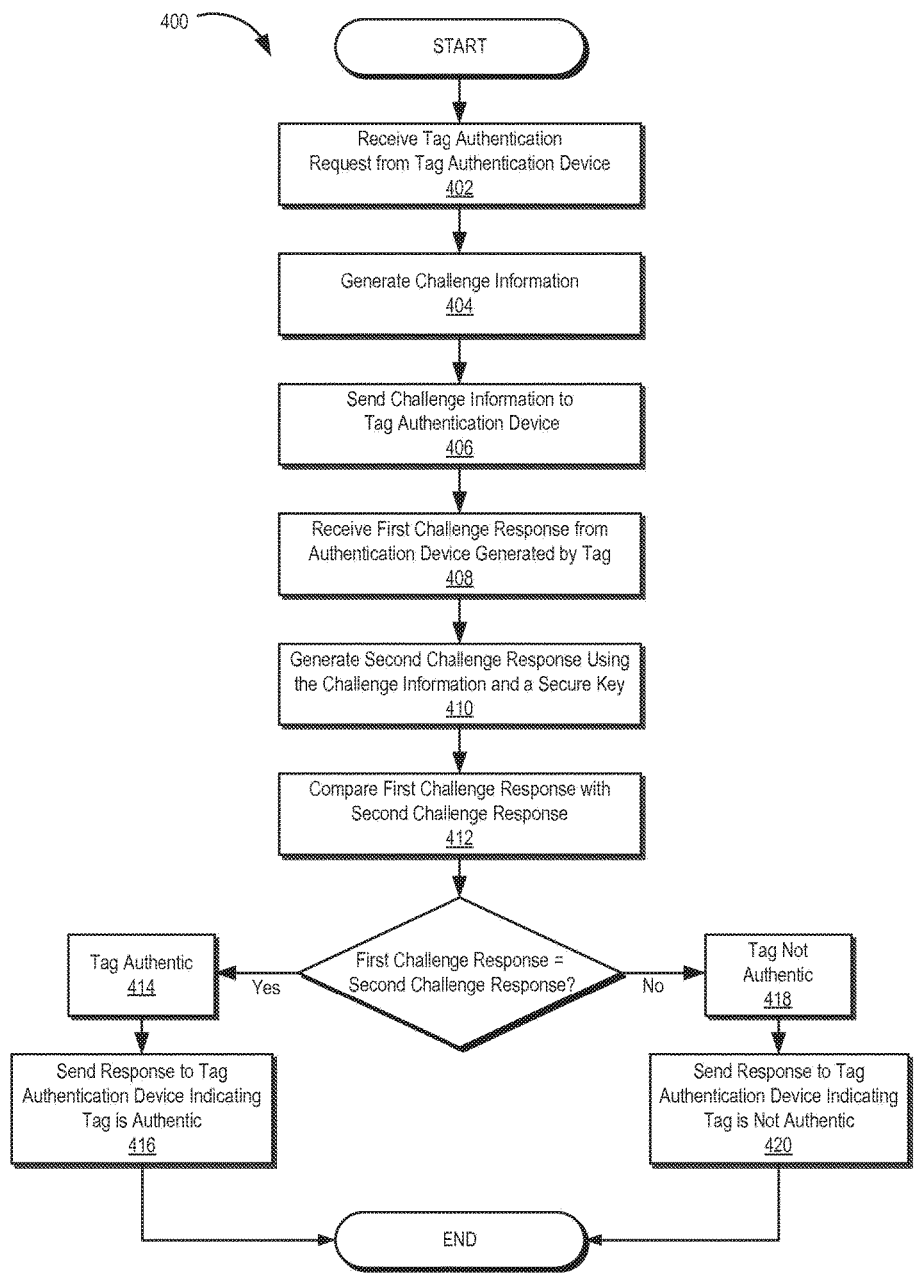
FIG. 4 illustrates a flow chart of an exemplary method for authenticating an electronic tag by a trusted authority consistent with embodiments of the present disclosure.

FIG. 4 illustrates a flow chart of an exemplary method 400 for authenticating a secure electronic tag by a trusted authority consistent with embodiments of the present disclosure. The illustrated method 400 may be implemented in a variety of ways, including using software, firmware, hardware, and/or any combination thereof. In certain embodiments, the method 400 may be implemented, at least in part, by a challenge generator and/or a tag authentication module executing on a trusted authority as described above.

At 402, a tag authentication request may be received from a tag authentication device that has detected a proximately-located tag. In certain embodiments, the tag authentication request may include information received by the authentication device from the proximate tag including, for example, tag identification information, transaction information, and/or the like. Upon receipt of the tag authentication request, the trusted authority may generate challenge information at 404. The challenge information may comprise a randomly and/or pseudo-randomly-generated value such as a cryptographic nonce. In other embodiments, the tag authentication device and/or another third-party service may generate challenge information and communicate it to the secure tag and/or the trusted authority.

The generated challenge information may be communicated to the tag authentication device at 406. The tag authentication device may communicate the challenge information to the tag as part of a challenge query. At 408, a first challenge response, generated by the tag in response to the challenge query, may be received by the trusted authority from the authentication device and/or the tag. At 410, the trusted authority may generate a second challenge response using the challenge information generated at 404 and secret information possessed by the trusted authority. In certain embodiments, the secret information possessed by the trusted authority used at 410 may be associated with a particular secure tag. In some embodiments, the secret information used by the trusted authority may be identified among multiple instances of secret information using tag identification information associated with the secure tag communicated from the tag authentication device (e.g., as part of a tag authentication request or the like).

In certain embodiments, the second challenge response may comprise the result of a computation performed by the trusted authority. For example, in some embodiments, the second challenge response may comprise a digitally-signed and/or a hashed value of a cryptographic nonce included in the challenge information. In certain embodiments, the computation performed by the trusted authority may be the same computation performed by the secure tag in response to a challenge query.

At 412, the first challenge response received from the tag authentication device and the second challenge response generated by the trusted authority may be compared. If the first challenge response and the second challenge response are the same, it may be determined that the tag is authentic at 414 (e.g., that the tag possesses secret information provisioned by the trusted authority). A response may be sent by the trusted authority to the tag authentication device at 416 indicating that the tag is authentic. If the first challenge response and the second challenge response are not the same, it may be determined that the tag is not authentic at 418 (e.g., that the tag does not possess secret information provisioned by the trusted authority). A response may be sent by the trusted authority to the tag authentication device at 420 indicating that the tag is not authentic.

Although not specifically illustrated, if a tag is determined to be authentic at 414, the response sent at 416 may further include additional information associated with the tag. For example, the response sent may further comprise tag metadata and/or transaction information associated with the tag including, without limitation, e.g., tag identification information, information relating to a product, device, and/or user associated with the secure tag, transaction information associated with the tag (e.g., account balances or the like), an authorization to proceed with a transaction, and/or any other suitable information. In some embodiments, data sent in response 416 may be signed by a trust authority, so that even when a device or trust authority forwards 416 to a third party (e.g., a service provider), the third party can use it as a proof of presence by verifying the trust authorities' signature.

It will be appreciated that FIG. 4 is provided for purposes of illustration, and not limitation, and that a number of modifications could be made to the process illustrated therein without departing from principles of the inventive body of work. For example, certain steps could be performed in a different order, combined with other steps, and/or the like. For example, in some embodiments the trusted authority could generate a desired challenge response, which could be transformed with, e.g., a key value (e.g., by encrypting it). When a challenge response is then received, it could simply be compared to the initially selected value (i.e., there would be no need, in this embodiment, to recomputed a challenge response at the server). It will thus be appreciated that any suitable challenge/response protocol or protocols could be used.

Serialized Product Validation

Certain embodiments of the disclosed systems and methods may be used in connection with identifying and/or detecting a variety of products and/or items. Detection of counterfeit items including, for example, art objects, designer clothing and accessories, original equipment manufacturer ("OEM") parts, pharmaceuticals, and/or the like, may become progressively more difficult with the advent of 3-dimensional printing and other technologies that make it easier to manufacture copies of objects that appear to be similar to originals. Systems and methods disclosed herein may use secure tags and tag authentication and/or presence verification to discourage and/or otherwise detect counterfeiting activities. Certain aspects of the systems and methods disclosed herein may be integrated into existing consumer devices using one or more executable applications, allowing consulters to identify counterfeit objects, to discourage counterfeiting by making it easier to identify, and to aid manufacturers and/or law enforcement authorities in identifying patterns of counterfeiting activities, evidence gathering, and/or the like.

Certain conventional systems utilizing electronic tags may use technologies known as online-to-offline ("O2O") protocols. In such a system, a tag may be associated with an object (e.g., a poster advertising a product or event). A consumer may tap a mobile device (e.g., a smartphone) that includes a tag reader to the object and be directed to a website (e.g., a page corresponding to a URL embedded in the tag) that provides additional information about the product or the event. In such a system, however, a tag may be counterfeited in such a way that a consumer may tap their mobile device to a tag, but the tag will direct the consumer to a website of the counterfeiter's choosing in a manner similar to "phishing" used in nefarious scam e-mail campaigns.

Systems and methods disclosed herein may be used to prevent counterfeiting of electronic tags and/or mitigate phishing activities by use of secure electronic tags, in some embodiments, a manufacturer, M, of a secure tag may obtain and/or otherwise generate a unique secret string S(M) or other secret information and a unique identifier ID(M). When the manufacturer produces a tag with an embedded URL, it may use a cryptographic function H( . . . ) (e.g., a one-way hash function) to compute H(S(M), ID(M), URL, . . . ), including any information beyond the URL it chooses (e.g., metadata information), and may securely embed the result of the computation into the secure tag. When the secure tag is read by a mobile device (e.g., via a tag authentication application executing thereon), the mobile device may check the result of the cryptographic function computation and the manufacturer identifier with a trusted service provider operating as a trusted authority that may also compute a result of the cryptographic function. If the results (e.g., the hashes) do not match, then the trusted authority can inform the mobile device and/or a user thereof that a counterfeit tag and/or a phishing attack is suspected. Further embodiments may extend the above-described method to facilitate detection of whether an object associated with a secure tag has itself been counterfeited.

Certain embodiments may allow a manufacturer of a physical item and/or product to securely associate a serialized secure tag with a serialized copy of the item and/or product. In certain embodiments, the secure tag may be associated with a product in a manner such that removal of the secure tag from the product would result in damage to the secure tag and/or the product. For example, a secure tag may be affixed and/or otherwise physically associated (e.g., via packaging) with a product, a container for the product, and/or the like. A trusted service provider (e.g., a trusted authority), T, may validate a legitimate product manufacturer, M. The trusted service provider may provide a unique secret string S(M) or other secret information and a unique identifier ID(M) associated with the manufacturer M to the manufacturer. When a manufacturer produces a serialized product, P, with a serial number, n, (where P(n) is the assignment of a serial number with a legitimate version of the product P) the manufacturer M can produce serialized secure tags that store a URL associated with the product, URL(P), and/or the trusted service, URL(T).

A cryptographic function H( . . . ) such as a hash function may be used to compute a result H(S(M), ID(M), URL(P), URL(T), P(n), . . . ). The result may be stored in each secure tag, resulting in a 1-to-1 correspondence between the serialized secure tags and the serialized products. The security of the secure tag may be maintained by the manufacturer of secure tag through ensuring that the unique secret string S(M) or other secret information are not exposed to other parties. As a secure tag may be used to identify the validity and/or authenticity of an associated product, the intrinsic value of an associated product may be tied to the secure tag.

Embodiments of the disclosed systems and methods may be used to validate the authenticity of a product in connection with a purchase transaction. As part of a purchase transaction, a user may use a smartphone or other mobile device to read information stored by a secure tag associated with a product. An application on the mobile device may inquire whether the user is purchasing the product as new or used. If new, embodiments of the systems and methods may be used to check to see if the particular serialized version of the product has been purchased new previously by another party. The application may also collect other data (e.g., UPS location information or the like) associated with a location of where the secure tag is being read by the mobile device in connection with the transaction. Embodiments of the systems and methods may further check when, where, and to whom the product may have been purchased previously if used. In some embodiments, an associated service may use this information and/or previously collected information obtained by the manufacturer (e.g., information regarding use and/or resale patterns) to determine the likelihood that the product is an authorized copy.

Figure 5:
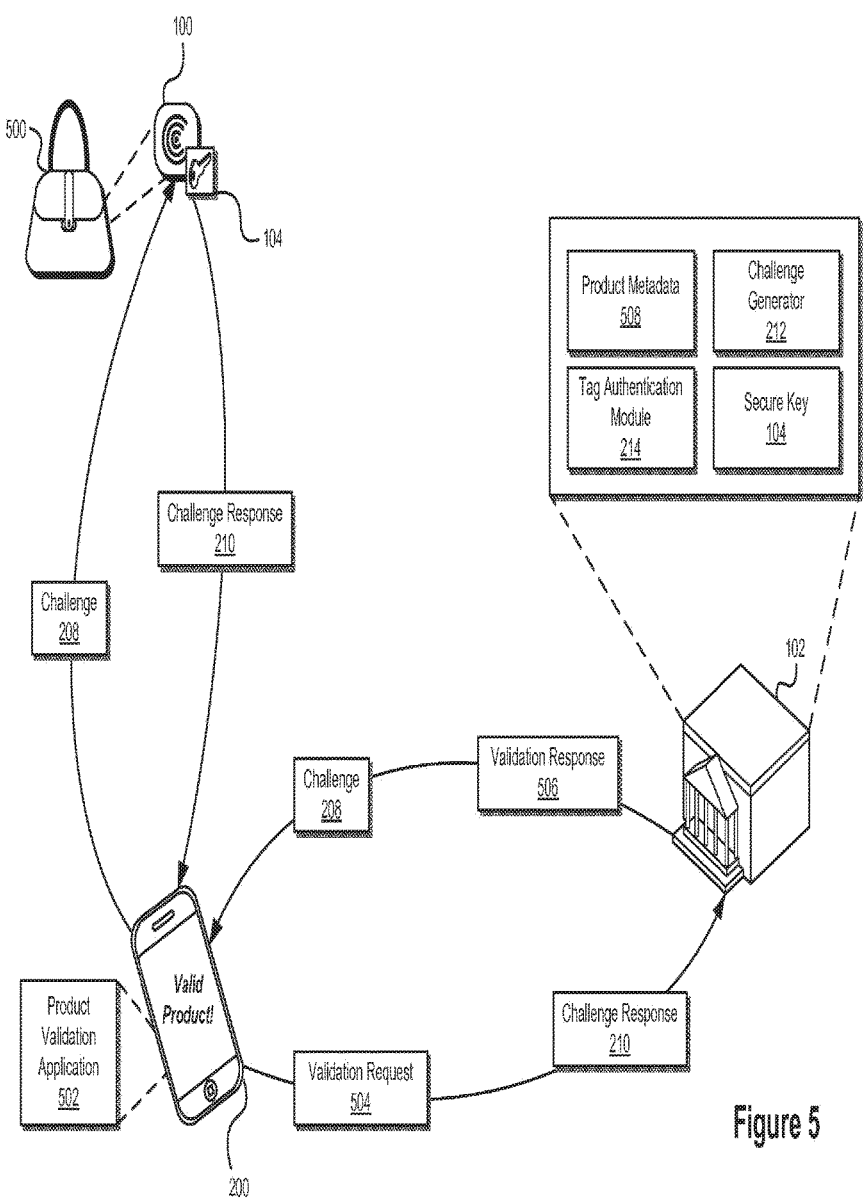
FIG. 5 illustrates validation of a serialized product including a secure electronic tag consistent with embodiments of the present disclosure.

FIG. 5 illustrates validation of a serialized product 500 including a secure electronic tag 100 consistent with embodiments of the present disclosure. The secure tag 100 may be provisioned with secret information 104 by a trusted authority 102 and/or another trusted service provider. After provisioning, the secure tag 100 may be securely associated with a product 500 (e.g., by a manufacturer of the product or another third party). The product 500 may include any product and/or item including, without limitation, art objects, designer clothing and accessories, OEM parts, vehicles, pharmaceuticals, value and/or reward cards, mobile devices, and/or the like. In certain embodiments, the product 500 may be a unique product. In further embodiments, the product 500 may be a serialized product 500. That is, the product 500 may be one of a plurality of copies of the product having an associated serial number or other unique identifier.

In certain embodiments, the secure tag 100 may be physically associated with the serialized product 500. For example, a secure tag 100 may be associated with a product 500 in a manner such that removal of the secure tag 100 from the product 500 would result in damage to the secure tag 100 and/or the product 500 and/or diminish the value associated with the secure tag 100 and/or the product 500. In further embodiments, a secure tag 100 may be affixed and/or physically associated with a product 500 and/or a container associated with the product 500 in such a manner that the presence of the secure tag 100 may not be visible or otherwise apparent on the product 500.

A user may be interested in obtaining information about the product 500. In certain circumstances, a user may be interested in obtaining information about the product 500 in connection with a transaction involving the product 500 such as a purchase. For example, in connection with a purchase transaction, a user may wish to, among other things, validate that the product 500 is an authentic product from its manufacturer and not a counterfeit, confirm that the product 500 is new or was not sold previously as new, obtain ownership history information regarding the product 500, and/or the like. Consistent with embodiments disclosed herein, the user may obtain such information through an authentication process involving the secure tag 100 associated with the product 500.

To validate the product 500 and/or obtain associated information, a user may use an authentication device 200. Among other things, the authentication device 200 may validate that the secure tag 100 is an authentic tag provisioned by the trusted authority 102, and, by extension, that the product 500 associated with the secure tag 100 is an authentic and/or valid product 500 located proximate to the authentication device 200. In certain embodiments, a product validation application 502 executing on the authentication device 200 (e.g., an application provided by the trusted authority 102, a manufacturer of the product 500, and/or any other party) may be used in connection with tag authentication and/or presence verification processes consistent with embodiments disclosed herein.

In some embodiments, the product validation application 502 may perform a polling process with the tag, authentication device 200 to detect a proximately-located product 500 including a secure tag 100. In other embodiments, other tag detection techniques can be used. When the product validation application 502 detects a proximately-located product 500 including a secure tag 100, the product validation application 502 may generate and communicate a product validation request 504 to the trusted authority 102 requesting validation of the product 500.

Similar to the tag authentication process described above in reference to FIG. 2, the trusted authority 102 may generate challenge information 208 using a challenge generator 212 and communicate the challenge information 208 to the secure tag 100 included in the product 500. The secure tag 100 may communicate a challenge response 210 that may include the result of a computation (e.g., a hash computation or the like) performed by the secure tag 100 using the challenge information 208 and the secret information 104 stored by the secure tag 100. The challenge response 210 may further include other information associated with the secure tag 100 such as, for example, serial and/or other identification information associated with the tag 100 and/or the product 500.

The trusted authority 102 may compare the result included in the challenge response 210 with a result of a similar computation it performs using a tag authentication module 214 based on the challenge information 208 and the secret information 104 it possesses. If the results match, or satisfy some predefined relationship, the trusted authority 102 may determine that the secure tag 100 is an authentic tag provisioned by the trusted authority 102 and, therefore, that the associated product 500 is valid. If the results do not match, the trusted authority 102 may determine that the secure tag 100 is not an authentic tag provisioned by the trusted authority and, therefore, that the associated product 500 is either not valid or has been associated with a counterfeit tag. The trusted authority 102 may communicate a product validation response 506 to the authentication device 200 indicating whether or not the product 500 was validated by the trusted authority. A user of the authentication device 200 may be presented with an indication on the device 200 as to whether the product 500 is valid based on the contents of the validation response 506 (e.g., "Product Valid"). In further embodiments, if valid, additional information regarding the product 500 (e.g., product metadata 508 maintained by the trusted authority 102 and/or another service) may be included in the validation response 506 and presented to a user of the authentication device 200

Consistent with embodiments disclosed herein, an associated serial number or other unique identifier stored by the secure tag 100 may be communicated to the trusted authority 102. The serial number or identifier may be used by the secure tag 100 in connection with computing the result included in the challenge response 210. Similarly, the serial number or identifier may be further used by the trusted authority 102 in computing a result for comparison with the result included in the challenge response 210 from the secure tag 100. In this manner, the authentication processes disclosed herein may use the unique serialized information associated with the secure tag 100 and/or product 500. The serial number or identifier may also be used by the trusted authority 102 in identifying and distributing product metadata 508 associated with the secure tag 100 and/or product 500 from a database of product metadata maintained by the trusted authority 102.

Maintaining a 1-to-1 correspondence of secure tags 100 to valid or legitimate products 500 may strengthen the ability of the disclosed systems and methods to mitigate counterfeiting. While serialized secure tags 100 may not be easily manufactured by counterfeiters, however, individual secure tags 100 could be copied (though not as easy as a product itself) so that there could be more than one copy of a given serialized tag in existence. Accordingly, in some embodiments, additional techniques may be employed to mitigate counterfeiting activities. For example, in certain embodiments, the trusted authority 102 may serve as a registration authority for manufacturers and for their products 500.

In some embodiments, the trusted authority 102 may provide consumers and manufacturers with a valuable service by vetting legitimate manufacturers and offering product validation services. Moreover, the trusted authority 102 may provide machine learning-based pattern detection services to identify patterns of illicit product copying and/or merchandising. The trusted authority 102 may collect data prior to introduction of a product 500 and may collect data from a user after the product 500 has been introduced (e.g., by collecting usage patterns of the user and subsequent users). Fraudulent behavior may be identified by the trusted authority 102 utilizing usage patterns identified in connection with the product validation techniques disclosed herein and/or GPS location, time, date, ownership, and/or product classification information.

Stolen Merchandise Identification

Certain embodiments of the disclosed systems and methods may be used in connection with discouraging and/or detecting theft. Upon purchasing or otherwise obtaining a new or used item, a consumer and/or seller can record, register, and/or otherwise claim ownership of the item with a trusted authority that may maintain such information. For example, a trusted authority may maintain information regarding whether an item is new or has been sold previously (e.g., items may be registered with the trusted authority as "new", "used", "first sale" "second sale", and/or the like). By associating a user identifier with each registered transaction, a list of products and/or serial numbers of products associated with a particular user may be maintained by the trusted authority. At a later date, if a user were to suffer a loss of an item due to theft, a user could retrieve a list of their items from the trusted authority and indicate which of these items is stolen and/or otherwise missing.

Reporting of stolen items to the trusted authority may be performed by a user directly and/or by another party such as a law enforcement official (e.g., as part of an official police reporting process or the like). For example, a law enforcement official may be given a special account associated with the trusted authority that may allow the official to report and/or identify items as stolen in an item database (e.g., a product metadata database) maintained by the trusted authority. Items may be flagged in such a way that if a user were to, for example, query about the status of an item by attempting to authenticate (e.g., scanning) its tag, claim ownership of the item, pass within proximity of an authentication device, and/or the like, a notification to the trusted authority, the law enforcement official, and/or other interested parties (e.g., another user claiming ownership of the item) could be provided.

Notifications may include, without limitation, notifying an authority that classified an item as stolen, notifying a user that the reported item was stolen, notifying authorities (e.g., law enforcement authorities) near a scanned item location (e.g., as determined by a location of an authentication device and/or other location identification means such as cellular radio triangulation, GPS, reported user location, IP address tracking, etc.) and/or notifying a potential purchaser (e.g., a person who attempted to scan or otherwise authenticate the item). In certain embodiments, notifications may include additional data such as, for example, a user account associated with an authentication request, a location (e.g., GPS location) of where a scan occurred, other environmental data corresponding to a secure tag and/or an authentication device, a date and/or location of where an item was reported as stolen, and/or the like. By enabling potential customers of stolen goods to validate the goods prior to purchase, the reach of law enforcement may be greatly increased to many points of sale within a gray market for goods, thereby helping to reduce the potential resale market for would-be thieves as well as locate individuals that may be involved in the laundering of stolen property.

Product Information Distribution

Figure 6:
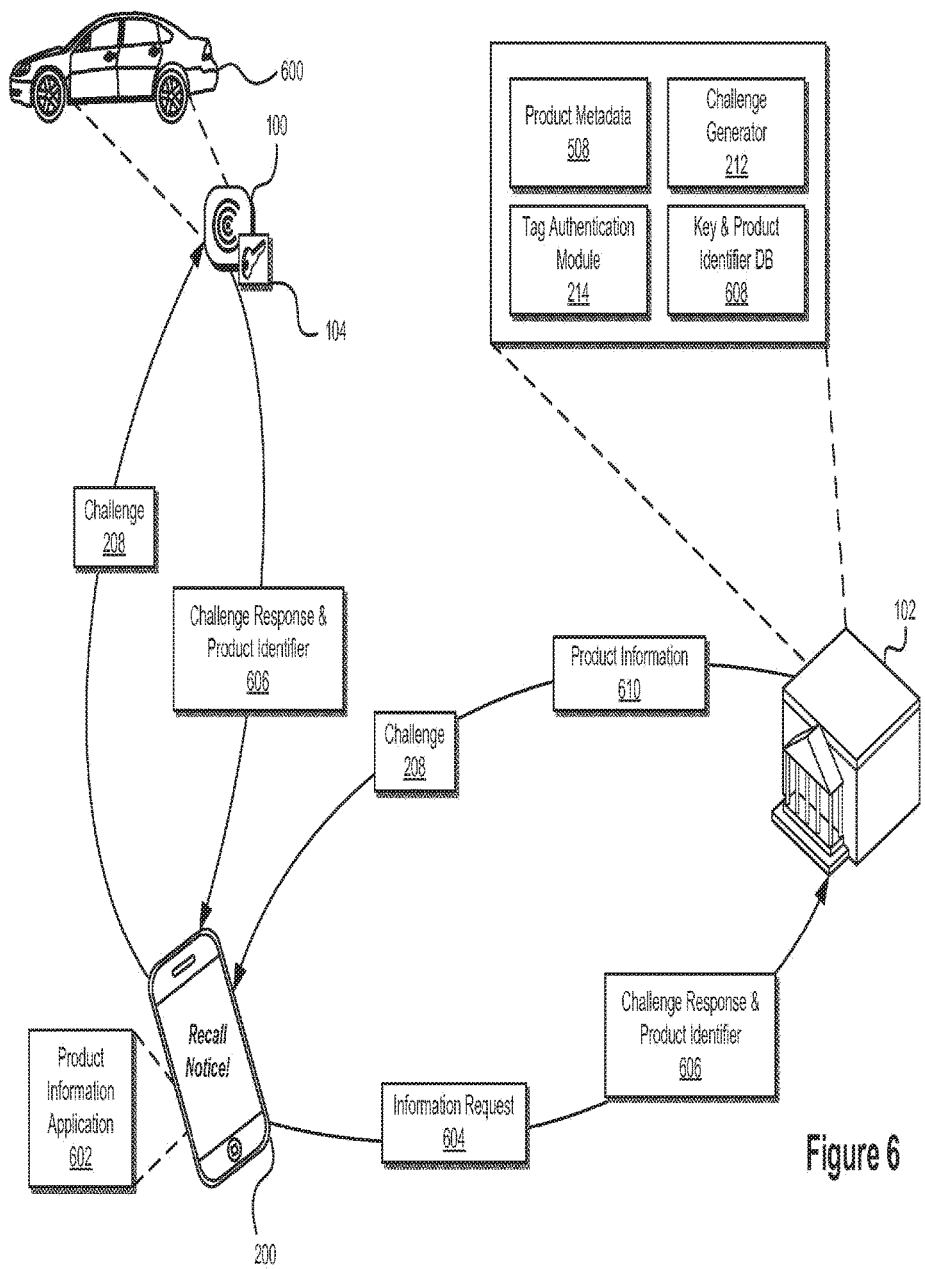
FIG. 6 illustrates distribution of information relating to a product including an electronic tag consistent with embodiments of the present disclosure.

FIG. 6 illustrates distribution of information relating, to a product 600 including a secure electronic tag 100 consistent with embodiments of the present disclosure. As discussed above, a secure tag 100 may be provisioned with secret information 104 by a trusted authority 102 and/or another trusted service provider and be securely associated with a product 600 (e.g., by a manufacturer of the product or another third party). Although the product 600 is illustrated as a vehicle, the product 600 may comprise any type of item and/or product, including any of the types of items and/or products detailed herein. In further embodiments, the product 600 may be an item such as an advertisement and/or other system (e.g., an informational kiosk or the like) that a user may interact with using the systems and methods disclosed herein to receive information relating to a product and/or service.

A variety of information of interest to a consumer may be associated with the product 600. For example, due to safety concerns or otherwise, manufacturers may issue safety recalls for certain product model numbers or certain specific sets of serial numbers for a given model number. When this occurs, a manufacturer may give some form of compensation to a consumer in exchange for the consumer destroying or removing the hazardous product 600 from service and/or for bringing the product in for repair. In some circumstances, only certain product model numbers or serial numbers may be affected and eligible for compensation in a product recall and, accordingly, securely authenticating serialized products 600 may be used in connection with servicing product recalls.

Embodiments of the disclosed systems and methods may facilitate such efforts by providing a convenient mechanism to gather and report such product information and/or to register and/or otherwise establish compliance with recall requirements (e.g., servicing, replacement, etc.). For example, in the case of a safety-related recall, it may be desirable to ensure that a potential hazardous product 600 is not resold to unsuspecting individuals. By extending the reporting capabilities disclosed herein to include product recall information, a potential customer can also be alerted to recalls on a specific model and/or serial number of a product 600 that they may be scanning with an authentication device 200. By collecting and/or auditing such data, manufacturers may be assisted in identifying authorized resellers or retailers that may have implemented a recall correctly or disreputable salespeople that may be ignoring the recall for profit.

A user may be interested in obtaining information regarding the product 600. For example, in connection with a purchase transaction, a user may wish to, among other things, validate that the product 600 does not have an outstanding manufacturer recall, that the product 600 has been serviced in accordance with a product recall and/or maintenance schedule, and/or receive any other information relating to the product 600. Consistent with embodiments disclosed herein, the user may obtain such information through an authentication process involving the secure tag 100 associated with the product 600.

To validate the product 600 and/or obtain associated information, a user may use an authentication device 200. For example, without limitation, in some embodiments, the authentication device 200 could be a user's smartphone or tablet, on which is loaded an application that interacts with a trusted authority 102 as described herein. Among other things, the authentication device 200 may validate that a secure tag 100 is an authentic tag provisioned by the trusted authority 102, that the tag 100 is physically located proximate to the authentication device 200 at a particular time, and, by extension, that the product 600 associated with the secure tag 100 is an authentic and/or valid product 600 located proximate to the authentication device 200. In certain embodiments, a product information application 602 executing on the authentication device 200 (e.g., an application provided by the trusted authority 102, a manufacturer of the product 600, and/or any other party) may be used in connection with tag authentication and/or presence verification processes consistent with embodiments disclosed herein.

When the product information application 602 detects a proximately located product 600 including a secure tag 100, the product information application 602 may generate and communicate an information request 604 to the trusted authority 102 requesting validation of the product 600. In certain embodiments, the information request 604 may comprise a request for information regarding the product 600 (e.g., recall information, service information, ownership information, and/or any other information related to the product 600).

Similar to the tag authentication process described above, the trusted authority 102 may generate challenge information 208 and communicate the challenge information 208 to the secure tag 100 included in the product 600. The secure tag 100 may communicate a challenge response 606 that may include the result of a computation (e.g., a hash computation or the like) performed by the secure tag 100 using the challenge information 208 and the secret information 104 stored by the secure tag 100. The challenge response 606 may further include other information associated with the secure tag 100 such as, for example, serial number and/or other identification information associated with the tag 100 and/or the product 600 (e.g., a product identifier).

The trusted authority 102 may compare the result included in the challenge response 606 with a result of a similar computation it performs using a tag authentication module 214 based on the challenge information 208 and the secret information it possesses stored in database 608 associating a plurality of cryptographic keys (e.g., secret keys, asymmetric keys, etc.) with a plurality of product identifiers. If the results match, the trusted authority 102 may determine that the secure tag 100 is an authentic tag provisioned by the trusted authority 102 and, therefore, that the associated product 600 is authentic. If the results do not match, the trusted authority 102 may determine that the secure tag 100 is not an authentic tag provisioned by the trusted authority 102 and, therefore, that the associated product 600 is not authentic.

Upon determining that the product 600 is authentic, the trusted authority 102 may provide the authentication device 200 with information 610 associated with the product 600 maintained by the trusted authority and/or another service (e.g., in a product metadata database 508 and/or the like). In certain embodiments, the information 610 provided to the authentication device 200 may comprise information requested by the authentication device 200 in connection with the information request 604. For example, the information 610 may comprise an indication of any manufacturer recalls associated with the product 600, a service history associated with the product 600, specifications and/or other information associated with the product 600, advertising materials associated with the product 600, ownership information associated with the product 600 (e.g., whether a product is stolen, ownership history information, etc.), and/or any other information associated with the product 600. The user of the authentication device 200 may be presented with an indication on the device 200 of the received product information 610 (e.g., "Product Recalled"). The product information 610 may further be provided to one or more third parties such as law enforcement agencies, product manufacturers, and/or the like.

Provenance Control and Product Registration

Certain embodiments of the systems and methods disclosed herein may be used to more tightly control and/or manage the handoff between registered owners of a product in the value chain and/or in the aftermarket. For high value items, it may be advantageous for a current owner to restrict a change in a registered status of a particular serialized item and/or maintain accurate records of all owners of the item to within a fair degree of certainty. For example, an owner of a luxury item may have many guests to his or her estate and/or a luxury retailer may have many potential customers view a product before an actual customer purchases it.

To prevent a casual user from "claiming" a new product in a store as having been purchased or a guest at a residence from "claiming" products that are not theirs, a current owner of such an item may place a lock on some or all of the data (e.g., product metadata) associated with their item maintained by a trusted authority and/or other service. For example, a product purchase attribute (e.g., "New", "First Sale", etc.) included in managed product metadata and an owner attribute (e.g., a current owner attribute) may be locked by a current owner (e.g., a retailer) when an item is on display in a store. During a purchase transaction, the retailer or other authorized party may unlock and change a purchase attribute (e.g., to "Sold") associated with an item, unlock an owner attribute, and remove their name or other identifier or otherwise change the owner attribute to the new party (e.g., the purchaser). At this time, the purchaser may scan a tag associated with an item and claim the item for themselves. If at a later time, the item is again sold, the process may be repeated, with each transaction having been recorded and securely stored by a trusted authority and/or other trusted service. In this manner, the provenance of the item can be tracked and/or reported as an intrinsic part of the item. In some embodiments, an item may gain value based on its verifiable provenance managed utilizing the systems and methods disclosed herein (e.g., a first baseball bat owned by a famous baseball player, a designer jewelry piece given by a famous actor, etc.).

Further embodiments of the disclosed systems and methods may be used in connection with product registration, warranty management, product recall management, product end of life management, and/or the like. For example, after items are purchased (e.g., new or used items), a new owner may scan an associated secure tag affixed to an item to log a serial number and/or model number, a date of purchase, and/or the like, and associate their own personal identification information with the item (e.g., by including such information in product metadata and/or other information managed by a trusted authority and/or other trusted service). If a particular item and/or serial number is subject to a future recall (e.g., a safety recall), a manufacturer may access a managed list of original and/or current owners of a product to inform relevant parties of the recall.

When a secure tag associated with an item is scanned with an authentication device consistent with embodiments disclosed herein, a user may be provided with a variety of information associated with the item. For example, a user may be provided with information regarding past recalls associated with the item, a serial number of the item, safety considerations, warranties or guarantees that may still be in effect for the item, end of support or service life for the particular item, model, and/or serial number, related products and/or offers that may be of interest to the user, and/or any other relevant information relating to the item. For product recall and/or warranty purposes, embodiments of the systems and methods disclosed herein may help to ensure manufacturers are not erroneously compensating purchasers of counterfeit items and/or may provide a verifiable reason for a manufacturer to deny customers compensation if they do not own a genuine item with a verifiable secure tag.

In some embodiments, a trusted authority and/or other service may govern permissions as to which parties may change various attributes and/or other metadata or information associated with an item managed by the trusted authority and/or service. For example, in some embodiments, a trusted authority and/or service may specify that only a manufacturer should be able to change a recall status for a particular serialized item, that only a manufacturer should be able to change a purchase status of an item to "New", that only a manufacturer or authorized repair center should be able to change the status to "Refurbished" or "Repaired" to factory standards, that only an authorized reseller should be able to change a purchase status to "First Sale", that only a registered owner or governmental authority should be able to remove/change ownership, that only a registered owner can add an assertion about the item and can only add it when they own it (e.g., "The lucky bat used in the 2020 world series"), and/or the like. Such policies can be enforced by any suitable technique, including without limitation conventional password authentication, DRM techniques such as those described in the '693 application, and/or the like.

Value, Loyalty, and Identification Card Transactions

Private currency and/or retailer points, rewards points, and/or the like may be implemented using value, loyalty, and/or other identification card-based systems. For example, a retailer such as a coffee shop may implement a reward point system where customers may accumulate loyalty rewards (e.g., reward points) in connection with transactions and may redeem them in exchange for certain products and/or services (e.g., a free coffee or the like). Significant effort and investment to build and maintain security of such private currency systems, however, may be required, as conventional systems typically use many elements including unique customer identification issuance, customer identification authentication, and back-end services to circulate private currencies. Moreover, it may be difficult to build a secure private currency system that may be used by multiple different retailers.

Embodiments of the systems and methods disclosed herein may be used in connection with a value, loyalty, and/or other identification card-based private currency system. Particularly, embodiments of the secure tag authentication techniques disclosed herein may be used in connection with determining a proof-of-presence of a value, loyalty, and/or other identification card including a secure tag in connection with a variety of secure transactions. Among other things, by verifying a presence of an authentic value, loyalty, and/or other identification card provisioned with an authentic secure tag at a location associated with a transaction, it may be determined that an associated user is actually present at the location.

Figure 7A:
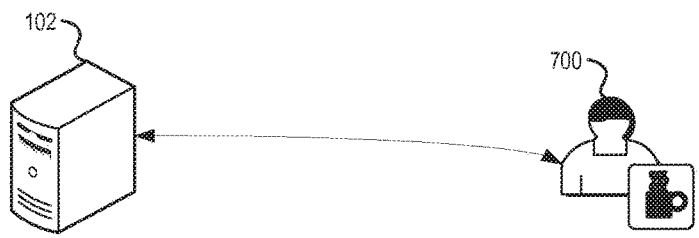
FIG. 7A illustrates provisioning of a loyalty card including an electronic tag consistent with embodiments of the present disclosure.

FIG. 7A illustrates provisioning of a loyalty card including a secure electronic tag consistent with embodiments of the present disclosure. In certain embodiments, a retailer (e.g., an owner of a shop) 700 or other party interested in implementing a value, loyalty, and/or other identification card-based private currency system may interact with a trusted authority 102 or other trusted service provider offering a privacy currency service (e.g., a web-based service or the like). In some embodiments, the trusted authority 102 may provide card-based private currency services for a plurality of parties (e.g., multiple restaurants or the like).

The retailer 700 or other party may establish an account with the trusted authority 102. By establishing an account with the trusted authority 102, the retail owner 700 may create a private currency for its patrons serviced by the trusted authority 102. In further embodiments, the retailer 700 may extend the availability of its private currency serviced by the trusted authority 102 to one or more other parties. In still further embodiments (e.g., situations where the value associated with the card is relatively small), secure and/or secret tags need not be used. Use could, instead, be made of, for example, a simple bar code in the user's possession (e.g., on a card and/or in a smartphone app).

The retailer 700 may be provided with one or more cards and/or other devices (e.g., keychain devices or the like) including tags and/or values consistent with embodiments disclosed herein. The cards may be distributed by the retailer 700 to one or more customers who wish to use the private currency offered by retailer 700 serviced via the trusted authority 102. In other embodiments, the retailer 70 may, rather than distribute a card to the user, distribute an application to the user's smartphone or other device that implements the techniques described herein using a value stored on the user's device (e.g., a secure and/or secret value installed at the time of manufacture (and/or a value derived therefrom), a value installed by the trusted authority 102, a non-secure value, and/or the like). Although, for ease of explanation, some of the examples described herein involve card-based systems, it will be appreciated that these systems could alternatively, or in addition, make use of applications running on a user's smartphone or other device (thereby obviating the need for the user to carry a separate card).

Figure 7B:
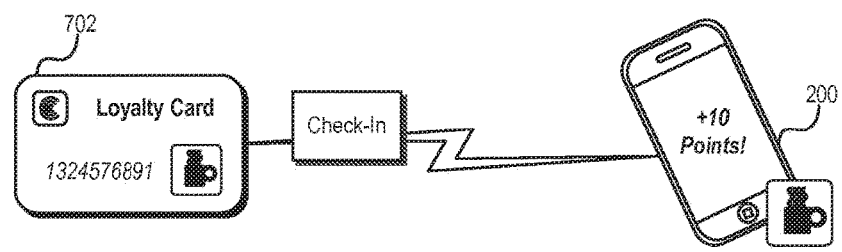
FIG. 7B illustrates a loyalty card authentication process consistent with embodiments of the present disclosure.

FIG. 7B illustrates a loyalty card 702 authentication process consistent with embodiments of the present disclosure. After distributing the loyalty cards 702 to one or more customers who wish to use the retailer's privacy currency, a customer may use the loyalty card 702 to authenticate their actual presence at a retailer location utilizing an authentication device 200. For example, a retailer may award a customer a certain number of points in a point based private currency whenever a customer buys a cup of coffee. When the customer visits the retailer, the customer may validate their physical presence by authenticating their loyalty card 702 using a private currency application executing on an authentication device 200 of the retailer (e.g., by "Checking-in"). In certain embodiments, validation of the presence of the customer by authenticating the presence of their loyalty card 702 proximate to an authentication device 200 may be performed utilizing embodiments of the secure tag authentication techniques disclosed herein. As discussed above, the authentication device 200 may comprise any suitable device (e.g., smartphone, tablet computing system, etc.) configured to execute an application that may be used to implement the disclosed secure tag authentication techniques. After validating their presence, a message may be displayed on the authentication device 200 indicating the results of the check-in process (e.g., an award of points to a private currency account associated with the customer).

Figure 7C:
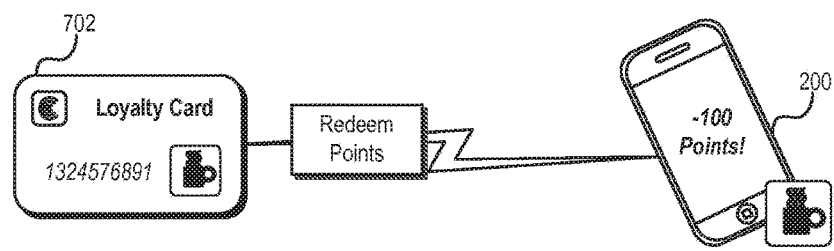
FIG. 7C illustrates a loyalty card redemption process consistent with embodiments of the present disclosure.

FIG. 7C illustrates a loyalty card 702 redemption process consistent with embodiments of the present disclosure. In certain embodiments, a customer may redeem accumulated points/currency when visiting a retailer location. For example, a customer may wish to purchase a cup of coffee using accumulated points/currency from a retailer. To redeem accumulated points/currency, a customer may validate their presence by authenticating the presence of their loyalty card 702 proximate to an authentication device 200 associated with the retailer's location. In certain embodiments, the retailer may use a private currency application executing on the authentication 200 to request a point/currency redemption process from a trusted authority implementing a private currency service (e.g., by designating an amount of points/currency being redeemed or the like). As part of the loyalty card 702 authentication process, the trusted authority may debit an account associated with the loyalty card 702 by an amount designated by the retailer using the private currency application, and may provide an indication to the authentication device 200 indicating a successful account debit.

Although discussed above in connection with a loyalty card system, it will be appreciated that similar processes may be disclosed in connection with value card, identification card, and/or any other card-based private currency systems. In certain embodiments, account balances associated with a card may be maintained and/or otherwise managed by a trusted authority performing secure tag authentication operations disclosed herein. In further embodiments, a trusted authority may be used to perform certain disclosed secure tag authentication applications and a separate third-party service offering a private currency may be used to maintain and/or otherwise manage account balances.

Private Currency Transactions

Figure 8:
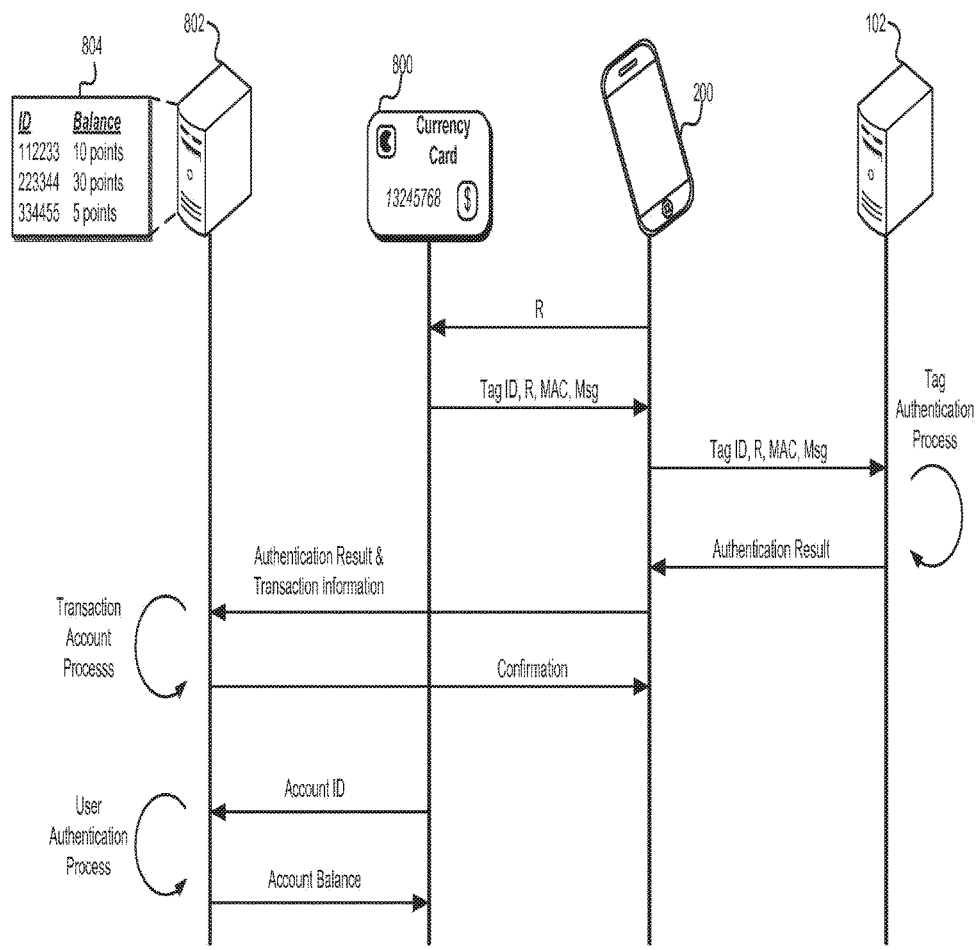
FIG. 8 illustrates a value card authentication and transaction process consistent with embodiments of the present disclosure.

FIG. 8 illustrates a value card 800 authentication and transaction process consistent with embodiments of the present disclosure. In the illustrated embodiments, a trusted authority 102 may be used in connection with an authentication device 200 for authenticating a value card 800 using embodiments of the secure tag authentication processes disclosed herein, and a private currency service 802 may be used to maintain and/or otherwise manage account balances 804 associated with the value card 800. Although illustrated as separate systems, it will be appreciated that in other embodiments certain functions of the authentication device 200, the trusted authority 102, and/or the private currency service 802 may be performed by a single system and/or any suitable combination of systems.

The value card 800 may include a secure tag provisioned with secret information by the trusted authority 102 and/or another trusted service. The trusted authority 102 may maintain a database associating, among other things, identification information of secure tags (e.g., Tag IDs), corresponding provisioned secret information (e.g., secure keys or the like), and/or account information of customers associated with the secure tags (e.g., Account IDs). In some embodiments, the value card 800 (and/or smartphone app and/or the like) need not include a secure tag, but could, instead, include an account number, and if a request was received to, e.g., debit the value associated with the card, some additional form of authentication (e.g., a password entered on the device 200) could be used to validate that the request was authorized.

A private currency application executing on the tag authentication device 200 may detect a proximately-located value card 800 including a tag or value consistent with embodiments disclosed herein (e.g., in response to a polling process or the like). Upon detecting the proximately-located value card 800, the tag authentication device 200 may generate and communicate challenge information, R, to a secure tag included in the value card 800. In certain embodiments, the challenge information may comprise a randomly and/or pseudo-randomly-generated value such as a cryptographic nonce (for ease of explanation, references herein to "random" values are meant to encompass truly random values, pseudo-random values, and/or the like), although other types of challenge information may also be used in connection with the disclosed systems and methods. In further embodiments, the challenge information may be generated and communicated to the secure tag by the trusted authority 102 and/or another trusted service (e.g., in response to an authentication request from the authentication device 200 or the like).

After receiving the challenge information, R, the secure tag of the value card 800 may generate a MAC and/or other calculation result based, at least in part, on the secret information stored by the secure tag. In further embodiments, the MAC may be further generated based on other data (e.g., arbitrary message data Msg). The MAC, tag identification information, challenge information, and/or other data may be communicated from the secure tag of the value card 800 to the proximately-located authentication device 200 that in turn may communicate the information to the trusted authority 102.

The trusted authority 102 may perform a tag authentication process consistent with embodiments disclosed herein based on the received information (i.e., Tag ID, R, MAC, Msg, etc.). For example, the trusted authority 102 may retrieve a secure key associated with the secure tag of the value card 800 based on the received tag identification information. The retrieved secure key may be used in connection with computing a MAC and/or other calculation result based on the secure key and the challenge information and/or other information received from the authentication device 200 (e.g., Msg). Once calculated, the trusted authority 102 may compare the calculated MAC with the MAC received from the authentication device 200 generated by the secure tag of the value card 800. If the two MAC values match, the trusted authority 102 may return an authentication result to the authentication device 200 indicating the secure tag (and by extension, the value card 800) is authentic and located proximate to the authentication device 200. If the two MAC values do not match, the trusted authority 102 may return an authentication result to the authentication device 200 indicating the secure tag and/or the value card 800 is not authentic.

If the received authentication result indicates the secure tag and/or value card 800 is authentic, the authentication device 200 may forward the result to a private currency service 802 associated with the value card 800. As discussed above, the private currency service 802 may, among other things, be used to maintain and/or otherwise manage account balances 804 associated with the value card 800 and transactions involving the value card 800. In addition to the authentication result, the authentication device 200 may communicate transaction information to the private currency service 802 relating to a transaction a user of the value card 800 wishes to perform. For example, the transaction information may request that a certain amount of points included in an account balance 804 associated with the value card 800 be subtracted and/or added and/or transferred to another account (e.g., an account associated with a user of the authentication device 200 or the like). Using such information, the private currency service 802 may perform an associated transaction process.

After performing the account transaction process, the private currency service 802 may communicate a confirmation that the transaction was successful to the authentication device 200. A user of the authentication device 200 may use such a confirmation to authenticate the transaction was performed, and may engage in actions to effectuate other aspects of transaction (e.g., providing a user of the value card 800 with a purchased product or the like).

In further embodiments, account identification associated with a user and/or the value card 800 may be communicated to the private currency service 802 by the value card 800 and/or the authentication device 200. After authenticating such account information, the private currency service 802 may, among other things, communicate account balance information to the value card 800 and/or the authentication device 200 that may be used to determine an available balance associated with the value card 800 and/or a user thereof. Although not specifically illustrated, in certain embodiments, an authentication process may be performed between the authentication device 200 and the private currency service 802 to authenticate that a user of the authentication device 200 is authorized to use the private currency offered by the private currency service 802.

Access Card Validation

Embodiments of the systems and methods disclosed herein may be used to verify the authenticity and/or status of an access card (e.g., an access pass, a transit pass, and/or the like). The disclosed systems and methods may, among other things, be used to verify that an access card including a secure tag is an authentic card provisioned by a trusted authority. Moreover, the disclosed systems and methods may be used to determine whether an account associated with an authenticated access card is active and/or has a balance sufficient for a particular transaction. For example, embodiments of the disclosed systems and methods may be used to determine that an authentic access card issued by a transit authority (e.g., a transit card) has been presented to an associated authentication device and that an account associated with the presented access card is active and/or has sufficient funds available for a particular trip.

Figure 9:
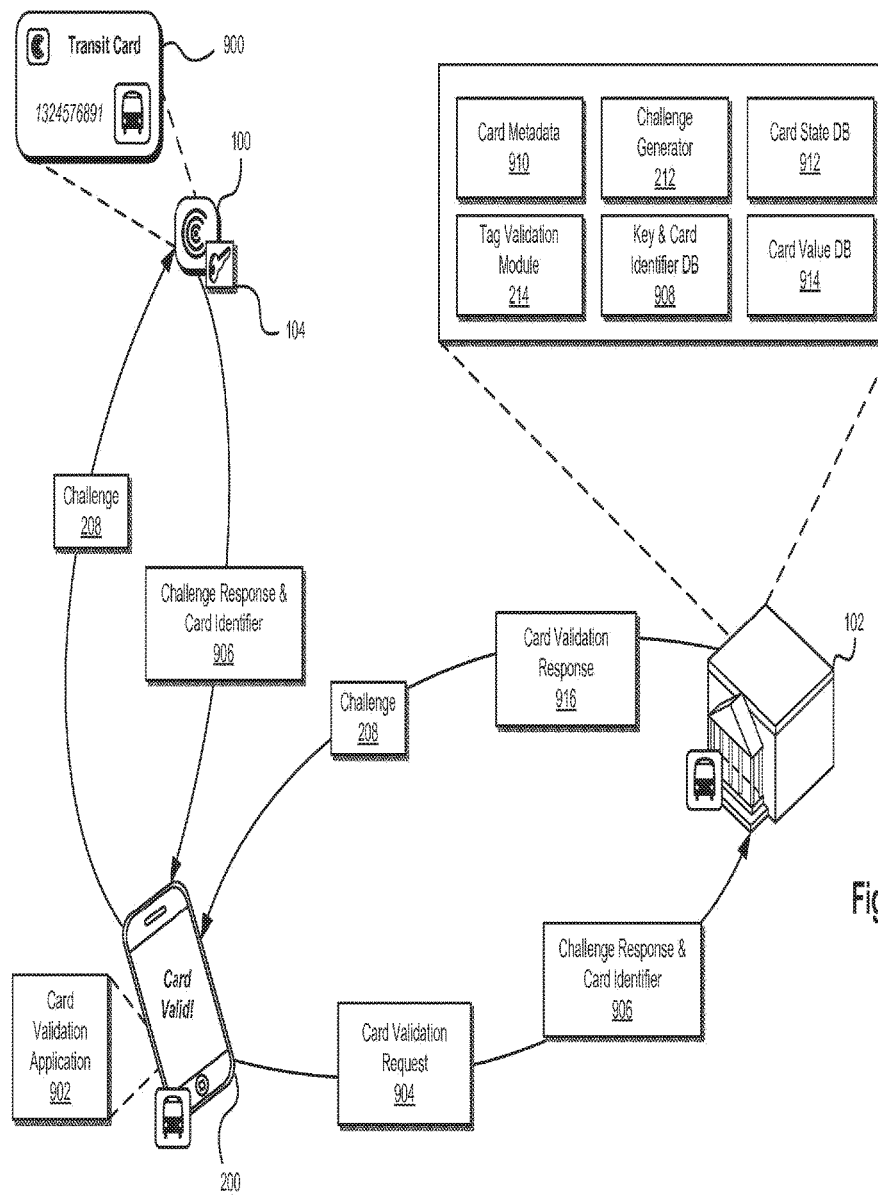
FIG. 9 illustrates authentication of a transit card consistent with embodiments of the present disclosure.

FIG. 9 illustrates authentication of a transit card 900 consistent with embodiments of the present disclosure. As discussed above, a secure tag 100 may be provisioned with secret information 104 by a trusted authority 102 and/or another trusted service provider and be securely associated with a card 900 or other device associated with a consumer. Although the card 900 is illustrated, as a transit card (e.g., a bus card, a rail card, and/or the like), the card 900 may comprise any type of access card including, for example, a building access card, a ski pass card, and/or the like.

A transit authority may wish to use a transit card 900 in connection with its fare system. In connection with a fare transaction, the transit authority may wish to validate that a transit card 900 presented by a user is an authentic card issued by the transit authority or another trusted party and not a counterfeit, that the transit card 900 is physically present at a terminal of the transaction, and that the transit card 900 has an active state and/or associated balance sufficient for a particular fare. Embodiments of the disclosed systems and methods may be used by a transit authority to perform such actions in connection with fare transactions.

A transit authority may distribute a plurality of authentication devices 200 executing a card validation application 902 consistent with embodiments disclosed herein at locations that they wish to allow users to engage in fare transactions. For example, authentication devices 200 may be distributed on transit authority busses, train cars, transit hubs, and/or the like. As embodiments disclosed herein allow for use of relatively low-cost general purpose tag authentication devices 200 (e.g., smartphones or tablet computing devices) in connection with secure tag authentication and/or presence verification, a transit authority may implement fare transactions consistent with the disclosed embodiments at a generally lower cost than conventional fare transaction systems.

To initiate a fare transaction, a user may present a transit card 900 including a secure tag 100 provisioned with secret information 104 to a proximately-located authentication device 200. In some embodiments, a card validation application 902 may perform a polling or other process with the tag authentication device 200 to detect a proximately-located transit card 900 including a secure tag 100. When the card validation application 902 detects a proximately-located transit card 900 including a secure tag 100, the card validation application 902 may generate and communicate a card validation request 904 to the trusted authority 102 requesting validation of the transit card 900.

Consistent with the tag authentication processes disclosed herein, a trusted authority 102 associated with the transit authority may generate challenge information 208 and communicate the challenge information 208 to the secure tag 100 included in the transit card 900 (e.g., via the authentication device 200). In further embodiments, the challenge information 208 may be generated by the authentication device 200 and communicated to the transit card 900 and the trusted authority 102. The secure tag 100 may generate a challenge response 906 that may include the result of a computation (e.g., a hash computation or the like) performed by the secure tag 100 using the challenge information 208 and the secret information 104 stored by the secure tag 100. The challenge response 906 may further include an identifier associated with the transit card 900 and/or the secure tag 100. The challenge response 906 may be communicated to the authentication device 200 and may be forwarded to the trusted authority 102 for authentication.

The trusted authority 102 may compare the result included in the challenge response 906 with a result of a similar computation it performs using a tag authentication module 214 based on the challenge information 208 and the secret information it possesses stored in a database 908. In some embodiments, secret information stored in the database 908 associated with the particular secure tag 100 may be identified by the trusted authority 102 using the identifier associated with the transit card 900 and/or the secure tag 100 included in the challenge response 906. If the result included in the challenge response 906 matches the result generated by the trusted authority, the trusted authority 102 may determine that the secure tag 100 is an authentic tag provisioned by the trusted authority 102 and, therefore, that the associated transit card 900 is authentic and not a counterfeit. If the results do not match, the trusted authority 102 may determine that the secure tag 100 is not an authentic tag provisioned by the trusted authority 102 and, therefore, that the associated transit card 900 is not authentic.

If it is determined that the transit card 900 is not authentic, the trusted authority 102 may communicate a card validation response 916 to the authentication device 200 indicating that the card 900 is not authentic. In further embodiments, one or more other parties (e.g., law enforcement officials or the like) may be notified of a transit card 900 being identified by the trusted authority 102 as not authentic, as such a determination may be an indication of counterfeiting activities.

If it is determined that the transit card 900 is authentic, the trusted authority 102 and/or another system may determine whether the transit card 900 is associated with an account having active state (e.g., as identified in a managed card state database 912 or the like) allowing a holder of the card 900 access to the transit system in connection with a fare transaction. In further embodiments, the trusted authority 102 and/or another system may determine whether an account associated with the transit card 900 has a sufficient balance for a particular fare (e.g., as reflected in a managed card value database 914) or the like in connection with a fare transaction. A user of the transit card 900 may interact with the trusted authority 102 to manage their card state and/or card value by funding an account associated with the transit card 900 (e.g., via a web interface offered by the trusted authority, a related service provider such as a transit authority, and/or the like).

If the trusted authority 102 determines that the account associated with the transit card 900 has a sufficient balance and/or an active state, the card validation response 916 sent to the authentication device 200 may include an indication that the fare transaction was successful, if the trusted authority 102 determines that the account associated with the transit card 900 has insufficient balance and/or an inactive state, the card validation response 916 sent to the authentication device 200 may include an indication that the fare transaction was unsuccessful. The user of the authentication device 200 may be presented with an indication on the device 200 of the contents of the received card validation response 916 (e.g., "Card Valid" or the like).

The state and/or account balance associated with the transit card 900 may be updated by the trusted authority 102 according to the fare transaction. For example, an account associated with the transit card 900 may be debited or the like. Similarly, a state associated with the transit card 900 may be changed in connection with the fare transaction.

In some embodiments, metadata associated with the transit card 900 stored by the trusted authority 102 in a card metadata database 910 may be included in the card validation response 916 communicated to the authentication device 200 by the trusted authority 102. For example, a photo of a user associated with the transit card, a passcode, and/or other contact information may be transmitted to the authentication device 200 by the trusted authority 102 in connection with the card validation response 916. Among other things, the card metadata may be used by a user of the authentication device 200 in determining not only that a transit card 900 is an authentic card having a sufficient account balance and/or valid associated state, but also that the individual presenting the transit card 900 in connection with a fare transaction is authorized to use and/or is otherwise associated with the card.

Mitigation of Replay Attacks

Figure 10:
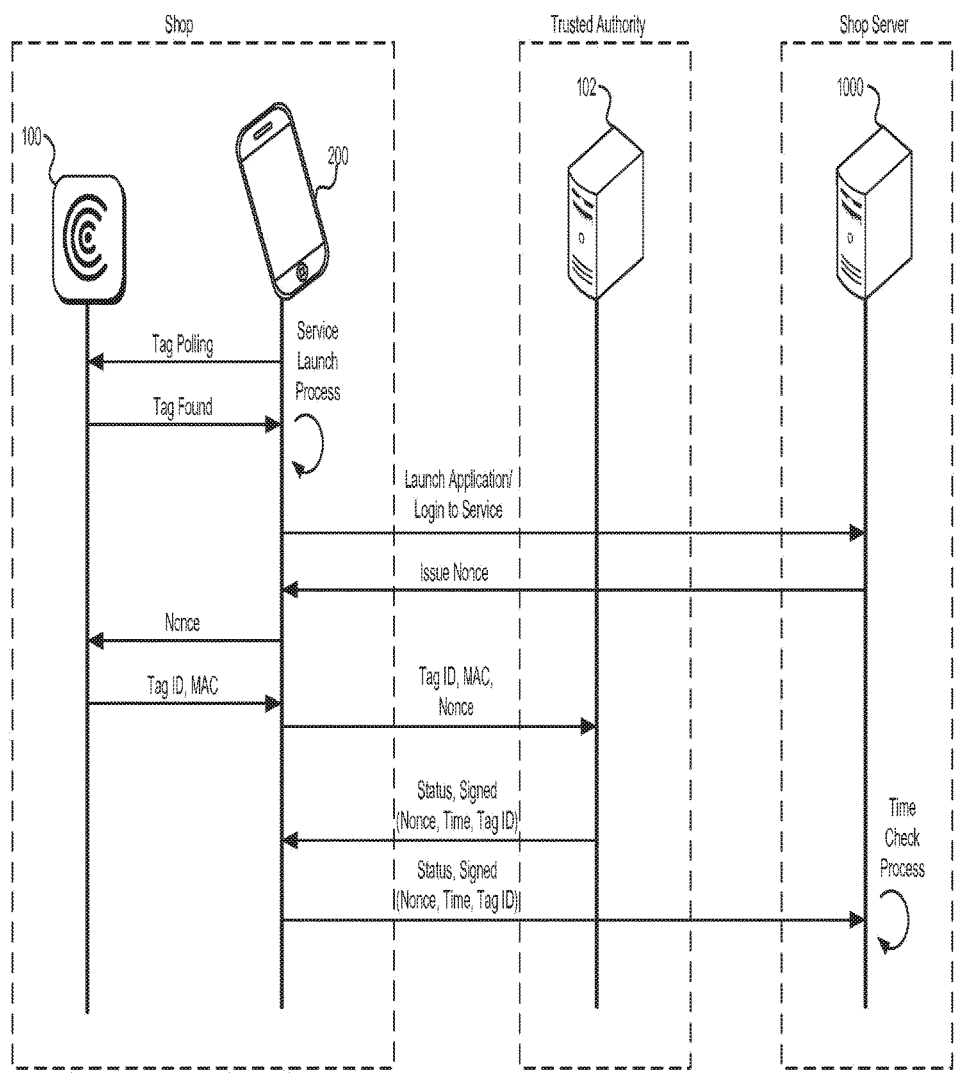
FIG. 10 illustrates a secure tag authentication process that may mitigate replay attacks consistent with embodiments of the present disclosure.

FIG. 10 illustrates a secure tag authentication process that may mitigate replay attacks consistent with embodiments of the present disclosure. In the illustrated embodiments, a trusted authority 102 may be used connection with an authentication device 200 and a shop service 1000 for authenticating a secure tag 100 using embodiments of the tag authentication processes disclosed herein. Although illustrated as separate systems, it will be appreciated that in other embodiments, certain functions of the authentication device 200, the trusted authority 102, and/or the shop service 1000 may be performed by a single system and/or any suitable combination of systems.

The secure tag 100 may be provisioned with secret information by the trusted authority 102 and/or another trusted service. A tag authentication application executing on an authentication device 200 (e.g., an authentication device associated with a shop or other retail establishment) may detect a proximately-located secure tag 100 in any suitable manner.

Upon detecting the proximately-located secure tag 100, a service application (e.g., a service associated with a shop) may be launched on the authentication device 200. In some embodiments, the service application may log in to a remote service offered by the shop service 1000. The shop service 1000 may generate and communicate challenge information to the secure tag 100 via the authentication device 200. In certain embodiments, the challenge information may comprise a randomly and/or pseudo-randomly-generated value such as a cryptographic nonce, although other types of challenge information may also be used in connection with the disclosed systems and methods. In further embodiments, the challenge information may be generated and communicated to the secure tag 100 by the trusted authority 102 and/or the authentication device 200.

After receiving the challenge information, the secure tag 100 may generate a MAC and/or other calculation result based, at least in part, on the secret information stored by the secure tag. In further embodiments, the MAC may be further generated based on other data. The MAC, tag identification information, challenge information, and/or other data may be communicated from the secure tag 100 to the proximately-located authentication device 200 that in turn may communicate the information to the trusted authority 102.

The trusted authority 102 may perform a tag authentication process consistent with embodiments disclosed herein based on the received information (e.g., Tag ID, nonce, MAC, etc.). For example, the trusted authority 102 may retrieve a secure key associated with the secure tag 100 based on the received tag identification information. The retrieved secure key may be used in connection with computing a MAC and/or other calculation result based on the secure key and the challenge information and/or other information received from the authentication device 200. Once calculated, the trusted authority 102 may compare the calculated MAC with the MAC received from the authentication device 200 generated by the secure tag 100. If the two MAC values match, the trusted authority 102 may return an authentication result (e.g., a status) to the authentication device 200 indicating the secure tag 100 is authentic and located proximate to the authentication device 200. If the two MAC values do not match, the trusted authority 102 may return an authentication result (e.g., a status) to the authentication device 200 indicating the secure tag 100 is not authentic.

In certain embodiments, in addition to a status (e.g., "authentic" or "not authentic") the authentication result returned to the authentication device 200 may further include challenge information, an authentication time, and tag identification information signed by the trusted service 102. The authentication device 200 my forward the signed challenge information, authentication time, and tag identification information to the shop service 1000. In certain embodiments, the shop service 1000 may award loyalty points and/or perform any other function associated with a successful authentication of the secure tag 100.

The shop service 1000 may check that the authentication time is within a particular time period. That is, the shop service 1000 may check that the signed authentication time is "fresh". The shop service 1000 may further check the "freshness" of the signed challenge information to determine that it was issued within a particular time period. If these values are not within a particular time period (i.e., not fresh), the shop service 1000 may determine that it should not award loyalty points or perform other functions associated with the authentication of the secure tag 100, as the age of the signed authentication time and/or challenge information may indicate a possible replay attack. In certain embodiments, as the authentication time and/or challenge information may be signed by the trusted authority 102, this mechanism may not rely on the security of the authentication device 200, thereby improving the ability of the disclosed embodiments to prevent potential replay attacks.

Tag Validation and Presence Confirmation Services

Certain embodiments of the systems and methods disclosed herein may be used in connection with an electronic commerce service such as a consumer-to-consumer ("C2C") business (e.g., an online auction service, classifieds advertisement service, etc.). For example, in an online auction service, it may be difficult for a bidder and/or the service to ensure authenticity of products for sale on the online auction service as a bidder may only have access to limited information regarding a product (e.g., a picture and/or description) that a seller chooses to post. Consistent with embodiments disclosed herein, a secure tag may be associated with a product, thereby enabling authentication of the product with a trusted authority and/or other service provider using the secure tag. When a product is authenticated by the trusted authority, an indication may be provided to the electronic commerce service, allowing the service to verify that a seller has actual physical possession of a given product, to determine whether product information provided from a seller in connection with an item matches product information from a manufacturer, and/or the like.

Figure 11:
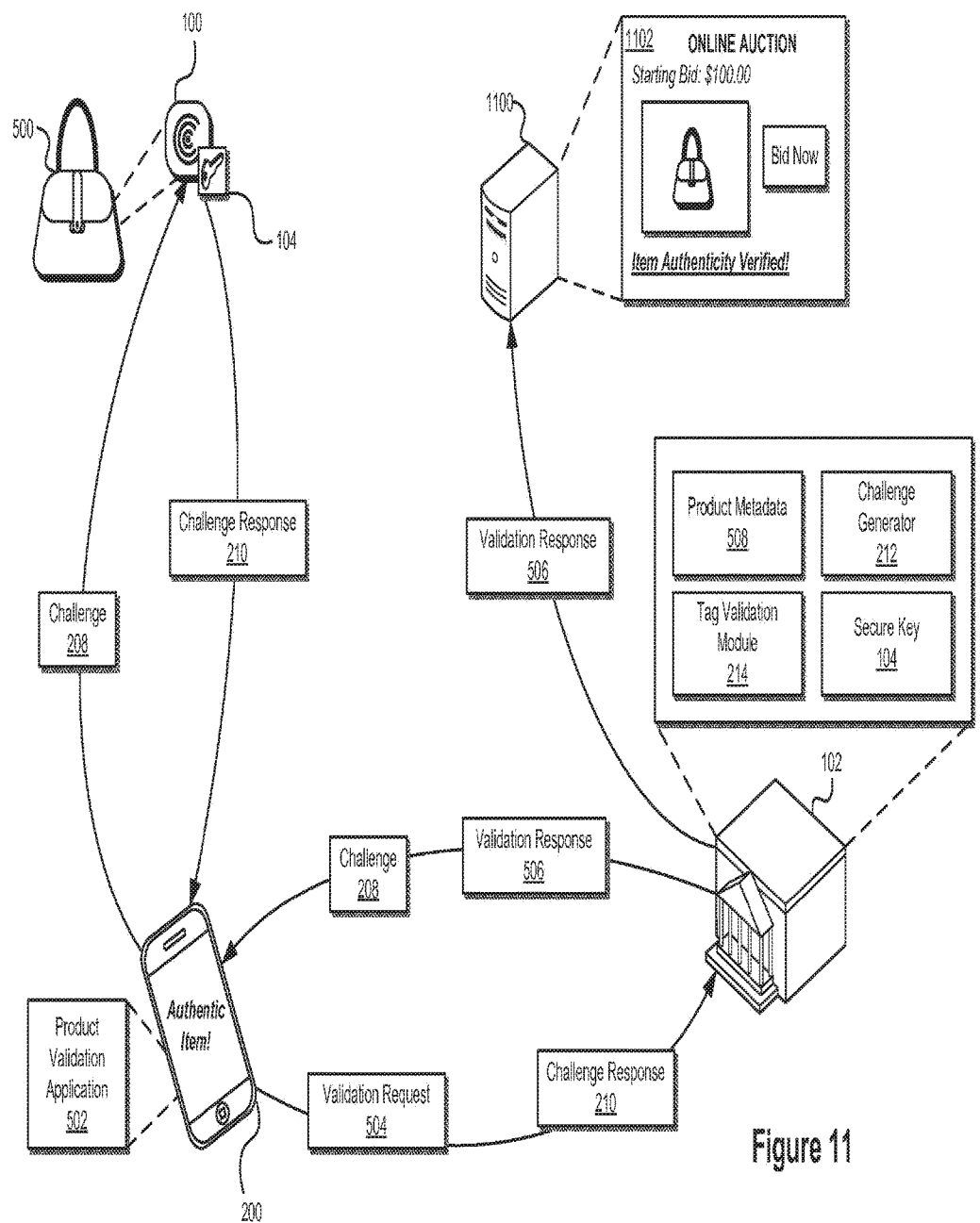
FIG. 11 illustrates product validation in connection with an electronic commerce service consistent with embodiments of the present disclosure.

FIG. 11 illustrates product validation in connection with an electronic commerce service 1100 consistent with embodiments of the present disclosure. In certain embodiments, the electronic commerce service 1100 may comprise a C2C service such as, for example, an online auction service, a classified advertisement services, and/or the like. It will be appreciated that a variety of other types of electronic commerce services may use the tag authentication and/or presence verification processes disclosed herein, and that any suitable type of electronic commerce or other service may implement the disclosed embodiments.

In connection with a purchase transaction using the electronic commerce service 1100, a user may wish to, among other things, validate that a product 500 offered for sale by a seller is an authentic product from its manufacturer and not a counterfeit, confirm that a product 500 is new or was not sold previously as new, obtain ownership history information regarding the product 500, and/or the like. Consistent with embodiments disclosed herein, such information may be obtained through an authentication process involving a secure tag 100 associated with the product 500, an authentication device 200, and/or a trusted authority 102. Such information may be further presented in connection with an interface 1102 offered by the electronic commerce service 1100 to a prospective buyer.

Validating the authenticity of the product 500 may be performed using an authentication device 200 and/or a trusted authority 102, as detailed above in connection with FIG. 5. For example, when a seller wishes to offer a product 500 for sale in an online auction administered by the electronic commerce service 1100, the user may choose to validate the authenticity of the product 500 with the electronic commerce service 1100. In certain embodiments, validating the product 500 with the electronic commerce service 1100 may, among other things, result in prospective buyers ascribing more value to the product 500 by virtue of its validation.

To validate the product 500, the seller may use a product validation application 502 executing on an authentication device 200 (e.g., a smartphone or a tablet computing device). As detailed above, a validation process utilizing the secure tag 100, the authentication device 200, and/or the trusted authority 102 may be performed, resulting in validation response 506 being issued by the trusted authority 102 and communicated to the authentication device 200. In certain embodiments, the validation response 506 may be further communicated to the electronic commerce service 1100. Upon receipt of the validation response 506, the electronic commerce service 1100 may present validation information to prospective buyers in connection with the associated product 500 via an associated interface 1102. In further embodiments, the validation response 506 may further include additional information regarding the product 500 (e.g., product metadata 508 maintained by the trusted authority 102 and/or another service) that may be presented to prospective buyers by the electronic commerce service 1100 via the interface 1102.

Figure 12:
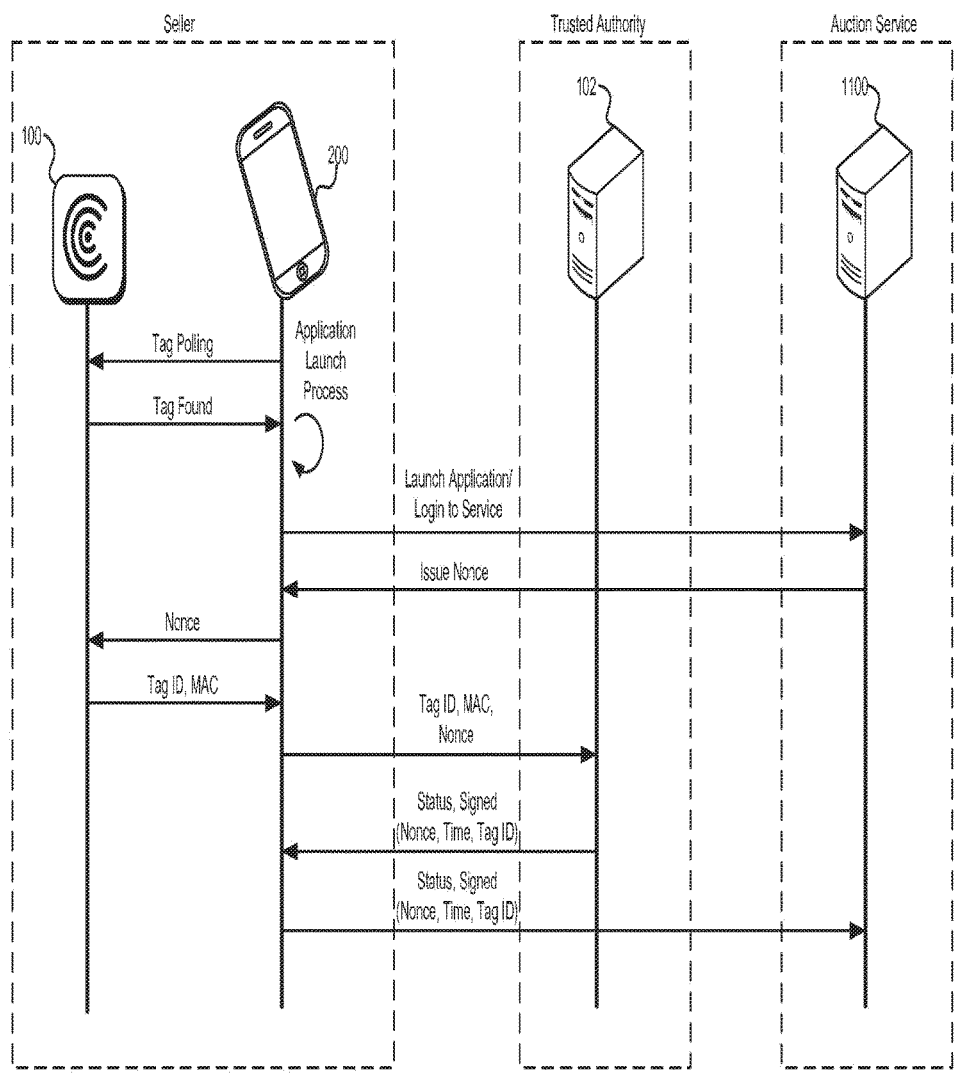
FIG. 12 illustrates another product validation process in connection with an electronic commerce service consistent with embodiments of the present disclosure.

FIG. 12 illustrates another product validation process in connection with an electronic commerce service 1100 consistent with embodiments of the present disclosure. In the illustrated embodiments, a trusted authority 102 may be used in connection with an authentication device 200 and an electronic commerce service 1100 for authenticating a product including a secure tag using embodiments of the tag authentication processes disclosed herein. Although illustrated as separate systems, it will be appreciated that in other embodiments, certain functions of the authentication device 200, the trusted authority 102, and/or the electronic commerce service 1100 may be performed by a single system and/or any suitable combination of systems.

The secure tag 100 associated with the product may be provisioned with secret information by the trusted authority 102 and/or another trusted service. A product validation application (e.g., an application provided by the electronic commerce service 1100) executing on an authentication device 200 associated with the seller may detect a proximately-located secure tag 100 consistent with embodiments disclosed herein.

Upon detecting the proximately-located secure tag 100, an application may be launched on the device 200 that may login to a service offered by the electronic commerce service 1100. The electronic commerce service 1100 may generate and communicate challenge information to the secure tag 100 via the authentication device 200. In certain embodiments, the challenge information may comprise a randomly and/or pseudo-randomly-generated value such as a cryptographic nonce, although other types of challenge information may also be used in connection with the disclosed systems and methods. In further embodiments, the challenge information may be generated and communicated to the secure tag 100 by the trusted authority 102 and/or the authentication device 200.

After receiving the challenge information, the secure tag 100 may generate a MAC, hash, and/or other calculation result based, at least in part, on the secret information stored by the secure tag. In further embodiments, the calculation may be further generated based on other data. The calculation result, tag identification information, challenge information, and/or other data may be communicated from the secure tag 100 to the proximately-located authentication device 200 that in turn may communicate the information to the trusted authority 102.

The trusted authority 102 may perform a tag authentication process consistent with embodiments disclosed herein based on the received information (e.g., Tag ID, nonce, MAC, etc.). For example, the trusted authority 102 may retrieve a secure key associated with the secure tag 100 based on the received tag identification information. The retrieved secure key may be used in connection with computing a MAC, hash, and/or other calculation result based on the secure key and the challenge information and/or other information received from the authentication device 200. Once calculated, the trusted authority 102 may compare the calculated result with the calculated result received from the authentication device 200 and generated by the secure tag 100. If the two values match, the trusted authority 102 may return an authentication result (e.g., a status) to the authentication device 200 indicating the secure tag 100 is authentic. If the two values do not match, the trusted authority 102 may return an authentication result (e.g., a status) to the authentication device 200 indicating the secure tag 100 is not authentic.

In certain embodiments, in addition to a status (e.g., "authentic" or "not authentic") the authentication result returned to the authentication device 200 may further include challenge information, an authentication time, and/or tag identification information signed by the trusted service 102. The authentication device 200 may forward the signed challenge information, authentication time, and tag identification information to the electronic commerce service 1100. In some embodiments, the electronic commerce service 1100 may further check the signed challenge information to confirm that the seller performed the authentication, the signed authentication time to confirm when the seller performed the authentication, and the signed tag identification information to confirm which product the seller authenticated. In further embodiments, the electronic commerce service 1100 may provide an indication of a product's validation to prospective buyers and/or perform any other function associated with a successful authentication of the secure tag 100.

Review Service Presence Confirmation

Certain embodiments disclosed herein may be used to enhance the propriety of an individual's comments, opinions, and/or reviews of a particular product and/or business posted in connection with an online review service. For example, a review by an individual posted to an online review service regarding a restaurant may be considered to be more valuable to users of the review service if it can be authenticated that the reviewer actually visited the restaurant. Similarly, it may be beneficial to users of a product review service to be provided with an indication in connection with a product review that a product reviewer actually possessed a reviewed product at the time they posted the review.

Embodiments of the systems and methods disclosed herein may provide for secure verification of the presence of an authentic electronic tag at a particular location at a particular time. Users of a review system may be provided with a card, smartphone application, or other device including a secure electronic tag and/or secret value that, when used in connection with an authentication device at a business' location, may be used to verify the user's presence at the location. Such verification may be used to, for example, verify that a business and/or product reviewer actually visited a business and/or possessed a product in connection with a posted review. Verification of a reviewer's presence at a reviewed location and/or possession of a reviewed product may improve the ability of users of a review service to differentiate reviews based on first-hand knowledge of a business and/or product from less reliable reviews.

Figure 13:
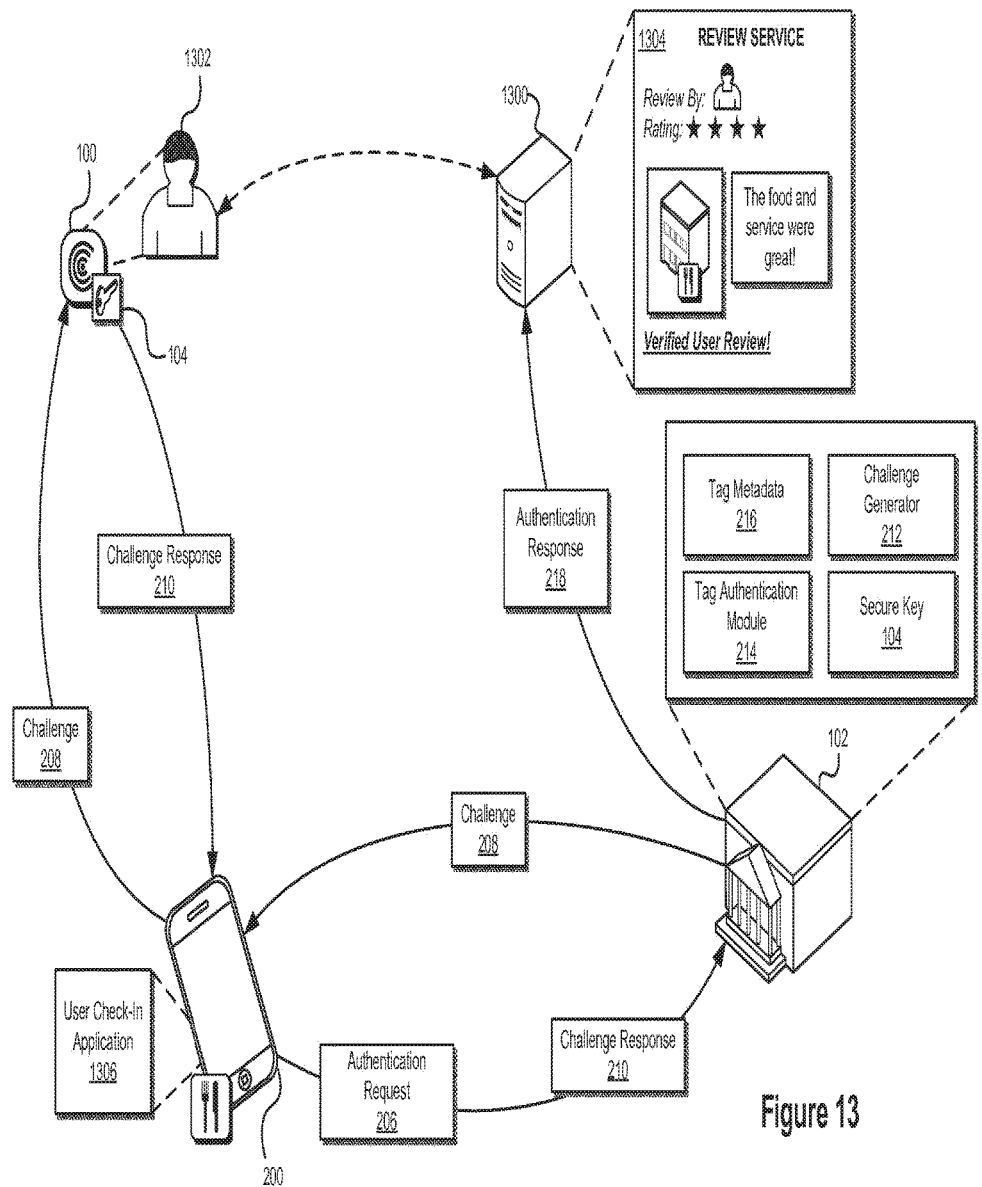
FIG. 13 illustrates presence validation in connection with a review service consistent with embodiments of the present disclosure.

FIG. 13 illustrates presence validation in connection with a review service 1300 consistent with embodiments of the present disclosure. In connection with a product review service 1300, a product reviewer 1302 may wish to, among other things, validate that they actually possess an authentic reviewed product. Similarly, in connection with a business review service 1300, a business reviewer 1302 may wish to, among other things, validate that they actually visited a reviewed business. Embodiments of the secure tag authentication techniques disclosed herein may be used in determining a proof-of-presence of a product and/or a business relative to a reviewer in connection with a variety of review services 1300.

Validating that a reviewer 1302 has possession of an authentic product and/or is physically present at a particular business may be performed using an authentication device 200 and/or a trusted authority 102 using the secure tag authorization and/or presence verification techniques disclosed herein. For example, when a reviewer 1302 wishes to verify in connection with a review 1304 that they actually visited a restaurant, the reviewer may choose to validate their presence at the restaurant with the trusted authority 102. To validate their presence, the reviewer 1302 may present a secure tag 100 associated with the reviewer 1302 to a check-in application 1306 executing on an authentication device 200 associated with the restaurant's location (e.g., a device located at or near an entryway or the like). As discussed above in connection with other embodiments, a validation process utilizing the secure tag 100, the authentication device 200, and/or the trusted authority 102 may be performed, resulting in an authentication response 218 being issued by the trusted authority 102 and communicated to the authentication device 200 validating the presence of the secure tag 100 proximate to the device 200. In some embodiments, a tag can be placed in the restaurant (for example, sealed in a table at the restaurant), and when a reviewer uses an authentication device 200 to get a tag authentication response 218 from the trusted authority 102, the device 200 or trusted authority 102 may forward it to a review service 1300 as a proof-of-presence.

In certain embodiments, the authentication response 218 may be further communicated to the review service 1300. Upon receipt of the authentication response 218, the review service 1300 may present validation information in connection with a posted review 1304 indicating that the reviewer 1302 actually visited the reviewed restaurant (e.g., "Verified User Review" or the like). It will be appreciated that similar embodiments may be used in connection with a product review service 1300, where a product reviewer 1302 may validate their possession of a reviewed product with a trusted authority 102 using an authentication device 200 and have such a validation communicated to the product review service 1300 for presenting in connection with a review of the product.

As discussed above, in alternative embodiments, a reviewer 1302 may be in possession of an authentication device 200 executing a check-in application 1306. An authenticable tag 100 may be associated with the restaurant's location (e.g., a tag located at or near an entryway, in or on a table, and/or the like). The reviewer 1302 may perform a validation process utilizing the authentication device 200, the secure tag 100, and/or the trusted authority 102, resulting in an authentication response 218 being issued by the trusted authority 102 and communicated to the authentication device 200 of the user validating the presence of the secure tag 100 proximate to the device 200. This response 218 may be utilized as a proof-of-presence of the reviewer 1302 at the restaurant's location.

In further embodiments, the response 218 may be communicated from the trusted authority 102 to the review service 1300. In some embodiments, a response 218 may be communicated from the authentication device 200 to the review service 1300. The review service 1300 may utilize the received response 218 as a proof-of-presence of the reviewer 1302 at the restaurant's location, presenting information in connection with a posted review 1304 indicating that the reviewer 1302 actually visited the reviewed restaurant (e.g., "Verified User Review" or the like).

Document Signing Services

Systems and methods disclosed herein may further be used in connection with a trusted document signing service. In certain jurisdictions, a signature, chop, and/or seal may be required to be applied to a document for the document to have legal effect. When applied to a document, a signature, chop, and/or seal may represent a unique mark (e.g., graphical mark) comprising any suitable character(s), image(s), and/or combination thereof. In certain embodiments, a signature, chop, and/or seal may be associated with an organization and, when applied to a document, denote the organization's approval of the document, authentication of the document's contents, authority of a signatory of the document (e.g., authority to act on behalf of the organization) and/or the like.

Among other things, embodiments of the disclosed trusted document signing service may ensure that a party applying an electronic signature, chop, and/or seal has authority to do so. In certain embodiments, electronic signing, chopping, and/or sealing using the disclosed embodiments may involve a user demonstrating possession of secret information before they may execute a document. In certain embodiments, possession of the secret information may be demonstrated through demonstrating possession of a secure tag or other associated item (e.g., a physical chop, seal, authorization card, etc.) storing the secret information. By demonstrating possession of the secure tag, the user may authenticate their authorization to apply an electronic signature, chop, and/or seal with the document signing service.

Figure 14:
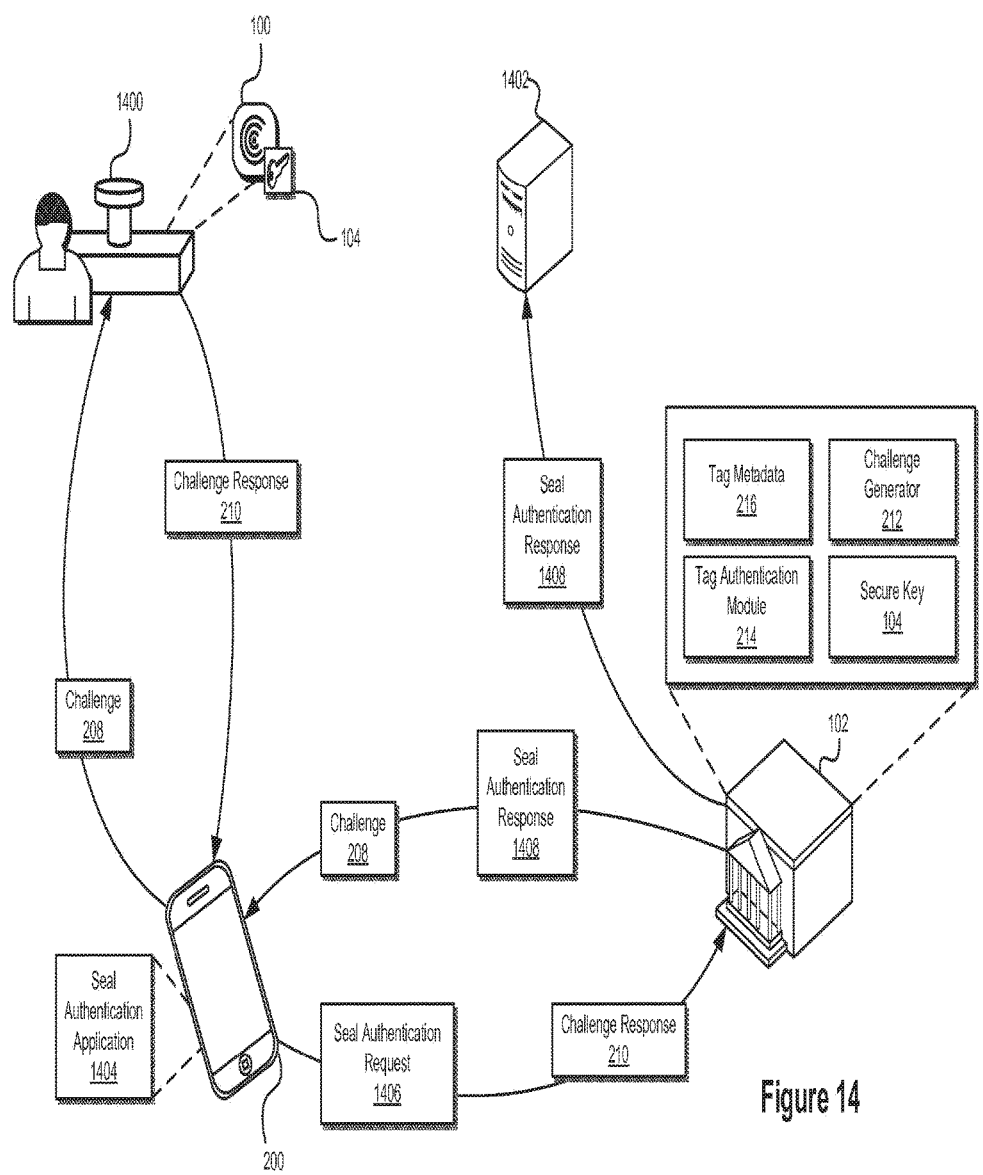
FIG. 14 illustrates authentication of a user in connection with a document signing service consistent with embodiments of the present disclosure.

FIG. 14 illustrates authentication of a user in connection with a document signing service 1402 consistent with embodiments of the present disclosure. In certain embodiments, the authentication may involve a determination of whether the user possesses certain secret information 104 stored in a secure tag 100, and by extension is authorized to electronically apply a signature, chop, and/or seal to a document. In some embodiments, the secure tag 100 may be included in a physical item such as a physical chop, seal 1400, pen, authorization card, mobile device, and/or the like that the user possesses by virtue of their authority to apply an associated signature, chop, and/or seal. It will be appreciated that a variety of other types of items may be used in connection with the processes disclosed herein, and that any type of item including a secure tag 100 (or, e.g., a smartphone running a secure application that makes use of a secret value stored in the smartphone's memory) may be used in the disclosed embodiments.

Validating that a user has possession of a seal 1400 including a secure tag 100 storing provisioned secret information 104 may be performed using an authentication device 200 and/or a trusted authority 102 implementing the secure tag authorization and/or presence verification techniques disclosed herein. For example, when a user wishes to apply an electronic signature, chop, and/or seal to a document, the user may choose to validate that they are in possession of the seal 1400 with the trusted authority 102. To validate their possession of the seal 1400, the user may present the seal 1400 to a seal authentication application 1404 executing on an authentication device 200 (e.g., a device associated with the user and/or the documenting signing service 1402). Similar to the processes discussed above in connection with other embodiments, a seal authentication request 1406 may be communicated to the trusted authority 102 from the authentication device 200, initializing an authentication process utilizing the secure tag 100, the authentication device 200, and/or the trusted authority 102. The authentication process may result in a seal authentication response 1408 being issued by the trusted authority 102 and communicated to the authentication device 200 validating the presence of the secure tag 100 proximate to the device 200. In certain embodiments, the seal authentication response 1408 may be further communicated to the documenting signing service 1402 as proof of the user's authorization to apply an associated signature, chop, and/or seal.

Figure 15:
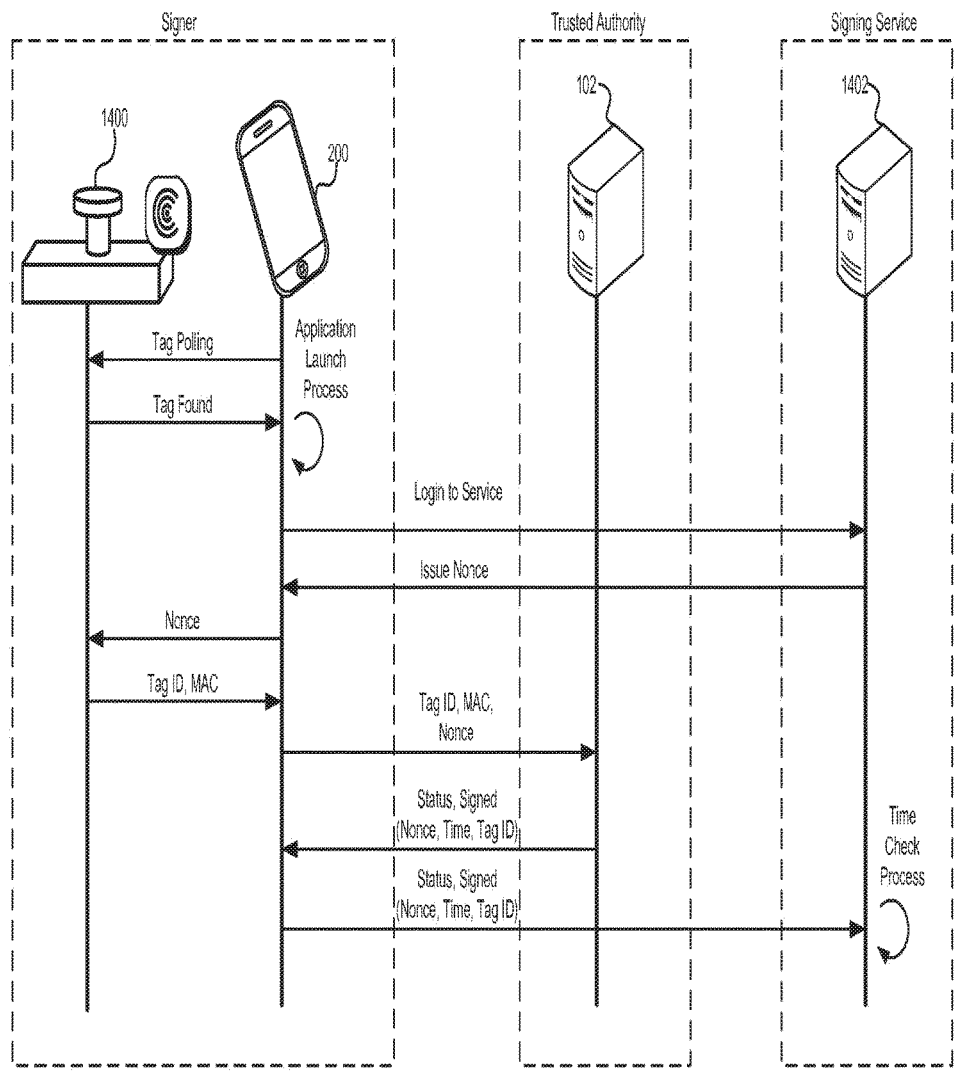
FIG. 15 illustrates a user authentication process in connection with a document signing service consistent with embodiments of the present disclosure.

FIG. 15 illustrates a user authentication process in connection with a document signing service 1402 consistent with embodiments of the present disclosure. In interacting with a document signing service 1402, a user may wish to, among other things, authenticate that they are authorized to electronically apply a signature, chop, and/or seal to a document by demonstrating possession of an item indicating such authorization such as a physical seal 1400. Embodiments of the secure tag authentication techniques disclosed herein may be used to authenticate a user's possession of such a seal 1400.

Authenticating that a user has possession of a physical seal 1400 demonstrating their authorization to apply a signature, chop, and/or seal may be performed using the physical seal 1400, an authentication device 200, and/or a trusted authority 102 using the secure tag authorization and/or presence verification techniques disclosed herein. Although illustrated as separate systems, it will be appreciated that in other embodiments, certain functions of the authentication device 200, the trusted authority 102, and/or the document signing service 1402 may be performed by a single system and/or any suitable combination of systems.

When demonstrating to a document signing service 1402 their authorization to apply a signature, chop, and/or seal, a user may validate their possession of a physical seal 1400 with a trusted authority 102. The physical seal 1400 may be provisioned with secret information 104 included in a secure tag 100 by the trusted authority 102 and/or another trusted service. The user may first launch an application (e.g., a seal authentication application) associated with the document signing service 1402 on the authentication device 200. The seal authentication application may detect a proximately-located secure tag 100 consistent with embodiments disclosed herein (e.g., in response to a polling process or the like). The authentication device 200 may then login to a signing service offered by the document signing service 1402.

The document signing service 1402 may issue challenge information such as a cryptographic nonce to the authentication device 200 and may associate the challenge information with a user requesting authentication. Alternatively, the authentication device 200, trusted service 102, and/or another trusted service may generate the challenge information. The authentication device 200 may communicate the challenge information to the secure tag 100 that, in response, may return a tag identifier and MAC calculated based on the challenge information. The authentication device 200 may then send the tag identifier, MAC, and challenge information to the trusted authority 102. Using this information, the trusted authority 102 may derive a MAC using the received tag identifier and challenge information.

If the MAC communicated to the trusted authority 102 and derived by the trusted authority 102 match, the trusted authority 102 may return proof of the match to the authentication device 200. In certain embodiments, this proof may comprise signed data including the challenge information, the tag identifier, and a timestamp. The authentication device 200 may forward this proof to the document signing service 1402. The document signing service 1402 may verify the signature of the proof for authentication. The document signing service 1402 may then use the tag identification to retrieve a signature, chop, and/or seal data for use by the authenticated user. In certain embodiments, applied signatures, chop, and/or seals may be associated with a date and/or time indicated by the returned timestamp.

Device-Based Secure Electronic Tags

In certain embodiments, a secure tag may be device-based and/or otherwise integrated into any suitable device, including any of the devices disclosed herein. Device-based secure tags may be used in a variety of circumstances. For example, a security firm may use device-based secure tags to confirm a security guard patrol visits certain designated checkpoints. The firm may place authentication devices at patrol checkpoints, and guards may use device-based secure electronic tags to provide a proof-of-presence at each patrol checkpoint. The security firm may use this proof-of-presence as a record of the security patrol.

Similarly, a company may wish to manage employees coming and going from a workplace. The company may place authentication devices at check-in points, and employees may use device-based secure electronic tags to provide a proof-of-presence for their signing in and out of the workplace. The company may use this proof-of-presence as a record of a number of hours that each employee works. Although discussed in connection with device-based secure electronic tags, it will be appreciated that the aforementioned examples may also use any other type of tag disclosed herein (e.g., card-based tags, insecure tags, etc.).

Figure 16:
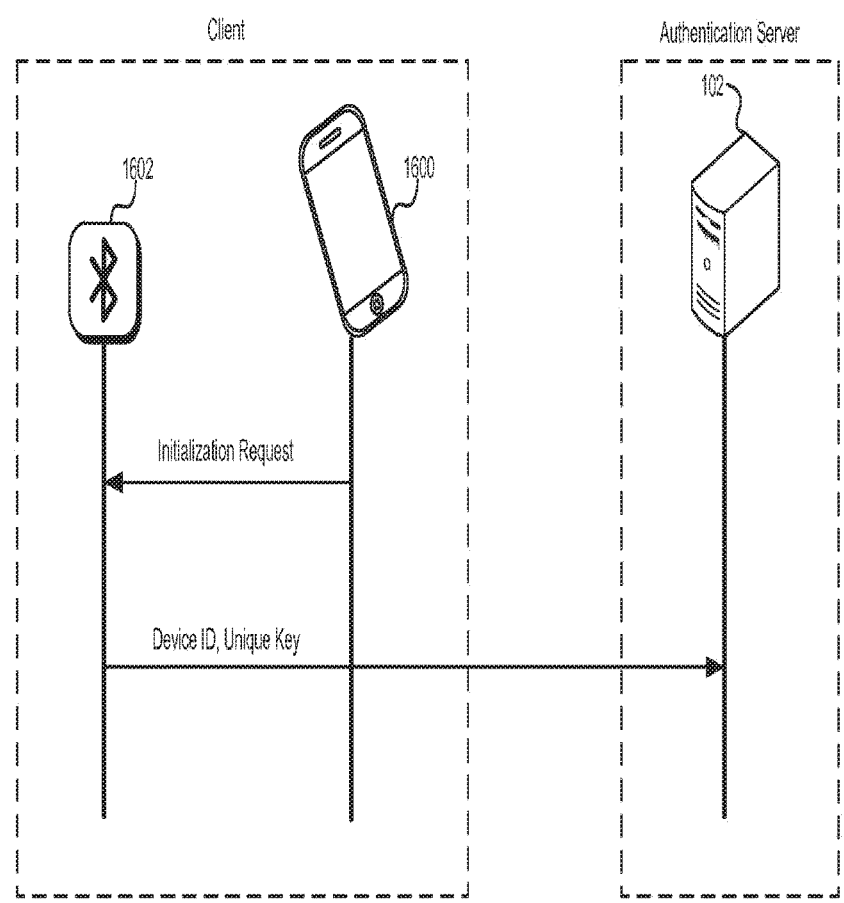
FIG. 16 illustrates an initialization process of a device-based tag consistent with embodiments of the present disclosure.

FIG. 16 illustrates an initialization process of a device-based secure tag consistent with embodiments of the present disclosure. In certain embodiments, a BLE device 1602 (e.g., a smartphone or the like) and/or any other suitable device may be provisioned with securely-embedded secret information (e.g., a unique key). In certain embodiments, the information may be securely-embedded into the BLE device 1602 via secure hardware, software, and/or combinations thereof. In some embodiments, the provisioning may be initialized by an initialization device 1600 that may provide the BLE device 1602 with a unique key. The unique key and/or identification information associated with the BLE device 1602 may be distributed to a trusted authority 102 configured to perform secure tag authentication and/or presence verification processes consistent with the disclosed embodiments. It will be appreciated that a number of variations can be made to the illustrated initialization processes. For example, in some embodiments, the BLE device 1602 may be initialized by the trusted authority 102 without the use of a discrete initialization device 1600.

Figure 17:
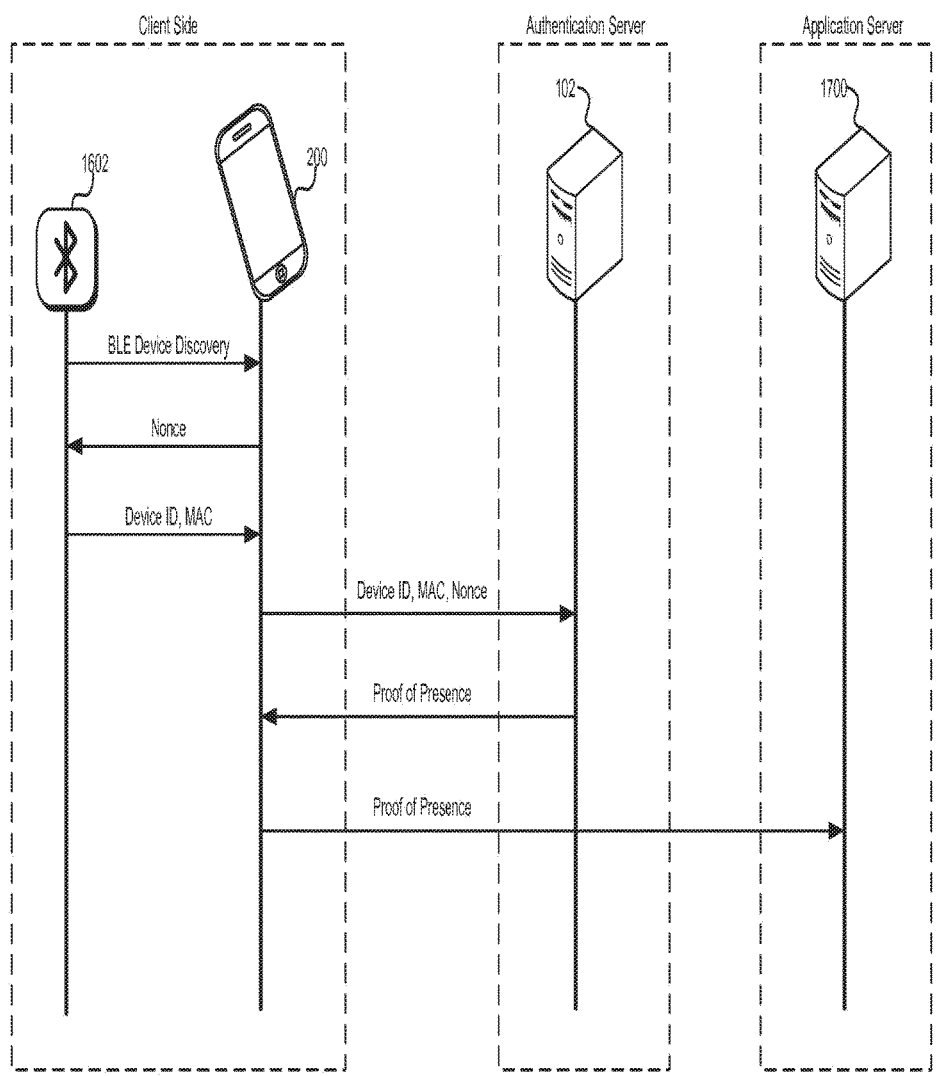
FIG. 17 illustrates an authentication process of a device-based tag consistent with embodiments of the present disclosure.

FIG. 17 illustrates an authentication process of a device-based secure tag consistent with embodiments of the present disclosure. As discussed above, in certain embodiments, a device-based secure tag may be implemented using a provisioned BLE device 1602. In certain embodiments, the illustrated authentication process may be used to verify the presence of the BLE device 1602 at a physical location associated with an authentication device 200 using a trusted authority 102. If verified, a proof-of-presence of the BLE device 1602 may be communicated to an application service 1700 implementing a service utilizing presence verification. Although illustrated as separate systems, it will be appreciated that in other embodiments, certain functions of the BLE device 1602, the authentication device 200, the trusted authority 102, and/or the application service 1700 may be performed by a single system and/or any suitable combination of systems.

The authentication device 200 may engage in a BLE device discovery process to locate a proximate BLE device 1602. Upon detecting the proximately-located BLE device 1602, the authentication device 200 may generate and communicate challenge information (e.g., a nonce) to the BLE device 1602. In certain embodiments, the challenge information may comprise a randomly and/or pseudo-randomly-generated value such as a cryptographic nonce, although other types of challenge information may also be used in connection with the disclosed systems and methods. In further embodiments, the challenge information may be generated and communicated to the BLE device 1602 by the trusted authority 102.

After receiving the challenge information, the BLE device 1602 may generate a MAC and/or other calculation result based, at least in part, on provisioned secret information stored by the BLE device 1602. In further embodiments, the MAC may be further generated based on other data. The MAC and identification information associated with the BLE device 1602 may be communicated to the authentication device 200. In turn, the authentication device 200 may communicate such information, along with the challenge information issued to the BLE device 1602, to the trusted authority 102.

The trusted authority 102 may perform a tag authentication process consistent with embodiments disclosed herein based on the received information (i.e., Device ID, nonce, MAC, etc.). For example, the trusted authority may retrieve secret information it possesses associated with the BLE device 1602 based on the received device identification information. The retrieved secret information may be used in connection with computing a MAC and/or other calculation result based on the secret information and the challenge information and/or other information received from the authentication device 200. Once calculated, the trusted authority 102 may compare the calculated MAC with the MAC received from the authentication device 200 generated by the BLE device 1602. If the two MAC values match, the trusted authority 102 may return proof-of-presence authenticating the BLE device's presence at a location of the authentication device 200. If the two MAC values do not match, the trusted authority 102 will not return a proof-of-presence. In certain embodiments, the proof-of-presence may be communicated from the trusted authority 102 and/or the authentication device 200 to the application service 1700, which may use the information in connection with a variety of presence verification-based services.

User Authentication Process

In certain embodiments, user authentication techniques may be used in addition to the secure tag authentication techniques disclosed herein. For example, username and/or password authentication, biometric authentication, personal identification number authentication, and/or any other suitable type of used authentication technique may be used in addition to the disclosed secure tag authentication techniques. In certain embodiments, implementing user authentication in addition to secure tag authentication may facilitate a determination that not only that a secure tag is an authentic secure tag provisioned by a trusted authority, but also that an individual presenting the secure tag in connection with a secure transaction is authorized to use and/or is otherwise associated with the secure tag.

In certain embodiments, user authentication may be active, where a user of a secure tag may authenticate their identity with a trusted authority and/or other service by demonstrating knowledge and/or possession of certain secret information such as a unique password, an identification number, and/or biometric information. In some embodiments, such information may be provided to an authentication device in connection with a secure tag authentication process and/or one or more other devices and/or services associated with a transaction. In further embodiments, user authentication may be passive, whereby information may be provided to an authentication device in connection with a secure tag authentication process that may be used by a user of the device to confirm that an individual presenting a secure tag is associated with the secure tag. For example, a photo and/or other personal information (e.g., height, weight, hair color, etc.) associated with an authorized user of an authenticated secure tag may be displayed on an authentication device. A user of the authentication device may use such information to confirm that a person presenting the secure tag in connection with a transaction matches the associated information.

In certain embodiments, user authentication may be performed using the authentication device. In further embodiments, one or more other systems may be used in connection with user authentication including, without limitation, a trusted authority and/or one or more other trusted services.

Personalized Advertisement and Information Services

In further embodiments, the disclosed secure tag authentication techniques may be used to facilitate consumer product merchandising and brand management. Embodiments disclosed herein may allow for a user to authenticate a secure tag included in a product using an authentication device and receive useful information regarding the product. Such embodiments may provide consumers with an assurance of product authenticity as well as rich product information from trusted sources.

Certain technologies, including the technologies described in the '406 application, the '538 application, and the '750 application, may be used in connection with the disclosed embodiments to provide product merchandisers and brand managers with assurance that the right consumers receive their information (e.g., targeted to their individual profile) with privacy protection, and that they will be able to retrieve detailed and timely analytics reports on the characteristics of consumers who buy and/or who are considering buying their products. Brand managers may also appreciate assurance of authenticity, detection of counterfeit and/or stolen items, identification of sales through unauthorized channels (e.g., with location reporting), and/or product registration for after-sale support and/or marketing that may be offered by the disclosed systems and methods.

Embodiments of the disclosed systems and methods may provide the aforementioned capabilities through use of inexpensive secure tags readable from consumer's mobile devices along with a trusted authority that assures that branding and messaging are not hijacked by others, that messaging appropriate for a given consumer is provided, and that messaging appropriate for retailers (e.g., store clerks, sales people, etc.) is provided to such parties and not consumers. Trusted services consistent with embodiments disclosed herein may help foil counterfeiters and/or identify unauthorized sales channels by location.

Certain embodiments may allow for rich back-channel information to be provided to product managers without violating consumer privacy. For example, the disclosed systems and methods may enable tracking and/or tracing of products through a distribution chain. This may, among other things, provide assurance to consumers regarding authenticity of products and detection of counterfeit products and their location (thereby discouraging counterfeiting), facilitate the detection and/or location of stolen products, allow for convenient, privacy-preserving tracking of consumer sales by geography, demographic, and/or consumer interests, provide privacy-preserving customer engagement at a point of sale, and/or facilitate privacy-preserving after-sale support and targeting.

Information may be provided to consumers and/or retailers when a secure tag is authenticated. For example, consumer-oriented information may be provided when an individual using a consumer authentication device authenticates a secure tag. Such information may be matched to and/or prioritized by the personal characteristics of the consumer without violating their privacy. In some embodiments, the information may be in a variety of formats including, without limitation, video, audio, text, etc.

Retailer-orientated information may be provided when a retailer using a retailer authentication device authenticates a secure tag. Retailer information may include retailer-specific information regarding a product such as information that could be confusing or overwhelming to a consumer but that can help the retailer in the sale of a product. Similarly, more specific information may be provided to users having special needs and/or requirements authenticate a secure tag. For example, a consumer with special needs, an individual legitimately reselling a used item, a clerk performing inventory, and/or the like, may be provided specific information relating to their needs when they authenticate a secure tag.

In certain embodiments, a trusted infrastructure may be used that ensures that proper information is provided to the right people under specific circumstances. In certain embodiments, the infrastructure may be scalable and efficient supporting a variety of devices and/or applications. Among other things, this may ensure that a consumer, using a properly authorized application executing on an authentication device, may enter any retail outlet, use their device to authenticate a product include a secure tag, and reliably receive authenticity and product information from trusted sources. Moreover, a product manufacturer may be assured that a consumer will receive the right messages and/or information about their product, that the information collected about a consumer's interaction with their products is communicated and accessed by authorized entities.

In some embodiment, interoperability may be provided, thereby enabling distribution of costs among a variety of brands and/or products, and ensuring that a consumer can rely on just one or a few authorized applications, rather than having to choose from among many applications for different retailers and/or products. In other embodiments, the systems and methods described herein can be deployed to support a single brand, product, business, or service, or to support a closed subset thereof. In some embodiments, a registration authority may be provided that ensures that those who own and/or control brands are the only ones authorized to provide information regarding branded products.

As an example of how a company with branded products may implement embodiments of the disclosed systems and methods, a company may first identify a compatible secure tag supplier (e.g., via a trusted authority or the like). The company may register with a trusted authority, providing relevant contact information, brand information, and/or the like. The company may obtain secure tags from the supplier and associate them with their products (e.g., by integrating them into their products and/or their product packaging). The company may upload tag information for each product (e.g., serialized tag identification information if the products are serialized) to the trusted authority. In addition, the company may upload product information and/or media or links to the same to be provided to consumers, retailers, and/or other parties that securely authenticate tags associated with their products. In certain embodiments, the company may specify how such information is displayed based on consumer attributes, a retail environment, location, etc.

After implementation, the company may login to the trusted authority to manage their information (e.g., via a dashboard or the like). The company may view a variety of information relating to its products. For example, the company may view reports (e.g., real-time reports) on consumer interactions with the company's products (e.g., consumer profiles, purchase/pass ratios, location information, etc.) and may collect consumer registrations, comments, and/or the like. The company may access fraud management services offered by the trusted authority to obtain information about possible counterfeiting, unlicensed product distribution, locations of unauthorized sales, and/or the like.

A consumer may interact with products provisioned with secure tags consistent with embodiments disclosed herein in a variety of ways. For example, a consumer may be able to download a shopping application to their mobile device to collect and view information regarding any product that includes a secure tag they authenticate. By authenticating a secure tag, the consumer may receive assurances of product authenticity and/or personalized information regarding a product. In some embodiments, a consumer may be able to store information and/or reminders regarding a product on their mobile device.

If a consumer decides to purchase a product provisioned with a secure tag, the consumer can register their purchase with a trusted authority and/or receive additional information relating to the product (e.g., warranty information, accessory information, user guides, etc.) using the disclosed systems and methods. The consumer may choose to interact with product websites provided by the product manufacturer. In certain embodiments, the shopping application may maintain information relating to a consumer's purchases and later connect the consumer to appropriate resources if a consumer requires assistances or wants to purchase additional goods and/or services. In certain embodiments, such a property inventory of the consumer may be useful for, among other things, insurance purposes, recovery of stolen goods, and/or deriving preference interferences and/or attributes to better provide personalized product matching and/or recommendations services.

System and Device Architecture

Figure 18:
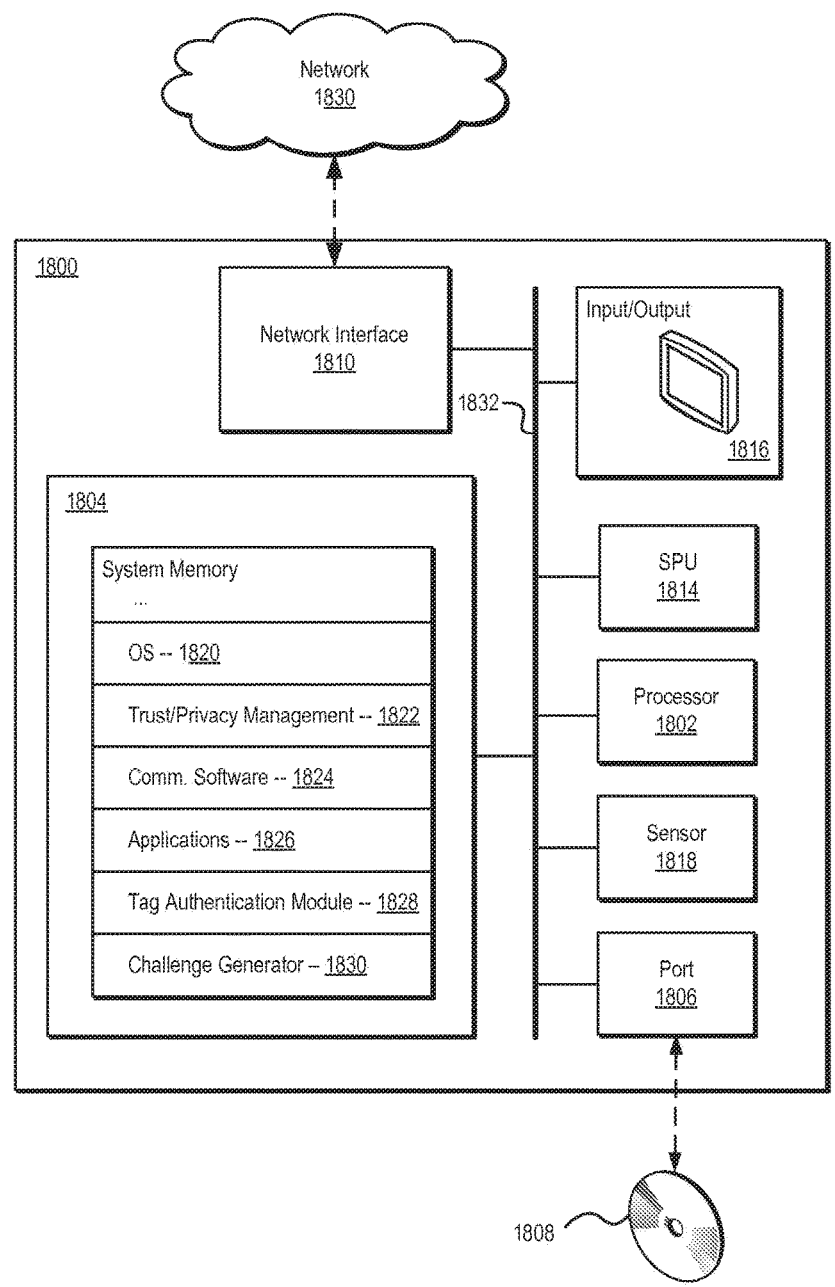
FIG. 18 illustrates a system that may be used to implement certain embodiments of the systems and methods of the present disclosure.

FIG. 18 illustrates a system 1800 that may be used to implement certain embodiments of the systems and methods of the present disclosure. The system 1800 may comprise a cellular telephone, PDA, a smartphone, a portable audio or video player, a tablet computer system, a server computer system, and/or any other system configured to implement the systems and methods described herein. In certain embodiments, the system 1800 may perform certain functions associated with an authentication device, a trusted authority, and/or another related service as disclosed herein.

As illustrated in FIG. 18, system 1800 may include: a processor 1802; system memory 1804, which may include high speed RAM, non-volatile memory and/or one or more bulk non-volatile computer-readable storage mediums (e.g., a hard disk, flash memory, etc.) for storing programs and other data for use and execution by the processor 1802; an interface 1816 (e.g., an input/output interface) that may include a display and/or one or more input devices such as, for example, a touchscreen, a keyboard, a mouse, a track pad, and the like; a port 1806 for interfacing with removable memory 1808 that may include one more diskettes, optical storage mediums, and/or other computer-readable storage mediums (e.g., flash memory, thumb drives, USB dongles, compact discs, DVDs, etc.); a network interface 1810 for communicating with other systems via a network 1812 using one or more communication technologies; one or more sensors 1818 that may comprise one or more location sensors, secure electronic tag sensors, and/or any other sensor system including any of the sensor systems disclosed herein; and one or more buses 1832 for communicatively coupling the aforementioned elements.

In certain embodiments, network 1832 may comprise the Internet, a local area network, a virtual private network, and/or any other communication network utilizing one or more electronic communication technologies and/or standards (e.g., Ethernet or the like), in some embodiments, the network interface 1810 and/or network 1832 may be part of a wireless carrier system, such as a PCS, and/or any other suitable communication system incorporating any suitable communication standards and/or protocols. In further embodiments, the network interface 1810 and/or network 1832 may be part of an analog mobile communications network and/or a digital mobile communications network utilizing, for example, CDMA, GSM, FDMA, and/or TDMA standards. In still further embodiments, the network interface 1810 and/or network 1832 may incorporate one or more satellite communication links and/or use IEEE's 801.11 standards, near-field communication, Bluetooth®, UWB, Zigbee®, and or any other suitable standard or standards.

In some embodiments, the system 1800 may, alternatively or in addition, include a SPU 1814 that is protected from tampering by a user of system 1800 or other entities by utilizing secure physical and/or virtual security techniques. SPU 1814 can help enhance and/or facilitate the security of sensitive operations such as private management of secret or other secure information, and other aspects of the systems and methods disclosed herein. In certain embodiments, the SPU 1814 may operate in a logically secure processing domain and be configured to protect and operate on secret information. In some embodiments, the SPU 1814 may include internal memory storing executable instructions or programs configured to enable to the SPU 1814 to perform secure operations.

The operation of system 1800 may be generally controlled by the processor 1802 operating by executing software instructions and programs stored in the system memory 1804 (and/or other computer-readable media, such as removable memory 1808). The system memory 1804 may store a variety of executable programs or modules for controlling the operation of the system 1800. For example, the system memory 1804 may include an operating system ("OS") 1820 that may manage and coordinate, at least in part, system hardware resources and provide for common services for execution of various applications and a trust and privacy management system 1822 for implementing trust and privacy management functionality including protection and/or management of secret information. The system memory 1804 may further include, without limitation, communication software 1824 configured to enable in part communication with and by the system 1800, applications 1826 (e.g., tag and/or product validation applications), a tag authentication module 1828, a challenge generator 1830, and/or any other information and/or applications configured to implement embodiments of the systems and methods disclosed herein.

One of ordinary skill in the art will appreciate that the systems and methods described herein can be practiced with computing devices similar or identical to that illustrated in FIG. 18, or with virtually any other suitable computing device, including computing devices that do not possess some of the components shown in FIG. 18 and/or computing devices that possess other components that are not shown. Thus it should be appreciated that FIG. 18 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method performed by a trusted system comprising a processor and a non-transitory computer-readable storage medium storing instructions that, when executed, cause the system to perform the method, the method comprising:

receiving, at an interface of the trusted system from an authentication device, a first challenge response generated by a secure tag, the first challenge response comprising a unique identifier associated with the secure tag and transaction information;

retrieving secret information stored by the trusted system based on the unique identifier included in the first challenge response;

generating, based on challenge information and the retrieved secret information, a second challenge response;

comparing the first challenge response with the second challenge response;

determining that the first challenge response and the second challenge response match;

determining that the challenge information was generated within a particular time period;

sending to an account service managed by a remote system separate from the trusted system, based on determining that the first challenge response and the second challenge response match and that the challenge information was generated within the particular time period, the unique identifier and the transaction information;

receiving, from the account service, an authentication response generated based on the unique identifier and the transaction information; and sending, via the interface of the trusted system to the authentication device, the authentication response.

2. The method of claim 1, wherein the method further comprises:

generating the challenge information; and sending, via the interface of the trusted system, the challenge information to the authentication device.

3. The method of claim 1, wherein the method further comprises:

receiving, at an interface of the trusted system from the authentication device, the challenge information.

4. The method of claim 1, wherein the challenge information comprises a randomly generated value.

5. The method of claim 1, wherein the challenge information comprises a cryptographic nonce.

6. The method of claim 1, wherein the secure tag comprises a secure near field communication ("NFC") tag.

7. The method of claim 1, wherein generating the second challenge response comprises:

computing a result of a cryptographic function based on the challenge information and the retrieved secret information.

8. The method of claim 7, wherein the cryptographic function comprises digitally signing the challenge information with the retrieved secret information.

9. The method of claim 7, wherein the cryptographic function comprises hashing the challenge information based on the retrieved secret information.

10. The method of claim 1, wherein the secret information comprises a secret key.

11. The method of claim 1, wherein the retrieved secret information is uniquely associated with the secure tag.

12. The method of claim 1, wherein the authentication response comprises an indication that a transaction associated with the transaction information has been approved by the account service.

13. The method of claim 1, wherein the authentication response comprises an indication that a transaction associated with the transaction information has been denied by the account service.

14. The method of claim 1, wherein the authentication response comprises an indication of a state of an account associated with the unique identifier managed by the account service.

15. The method of claim 1, wherein the authentication response comprises indication of a balance of an account associated with the unique identifier managed by the account service.

16. The method of claim 1, wherein the secure tag is associated with a card.

17. The method of claim 1, wherein the authentication response comprises metadata associated with the unique identifier.

18. The method of claim 17, wherein the metadata comprises identification information associated with a user associated with the secure tag.

* * * * *